(12) United States Patent
Dickey

(10) Patent No.: US 12,368,293 B2
(45) Date of Patent: *Jul. 22, 2025

(54) SAFETY INTERLOCKS FOR OUTLETS

(71) Applicant: JTech Solutions, Inc., San Ramon, CA (US)

(72) Inventor: J. Scott Dickey, San Ramon, CA (US)

(73) Assignee: JTech Solutions, Inc., San Ramon, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/153,309

(22) Filed: Jan. 11, 2023

(65) Prior Publication Data

US 2023/0223745 A1 Jul. 13, 2023

Related U.S. Application Data

(60) Provisional application No. 63/266,666, filed on Jan. 11, 2022.

(51) Int. Cl.
*H02H 1/00* (2006.01)
*H01H 71/04* (2006.01)
*H01H 77/00* (2006.01)
*H02H 5/04* (2006.01)

(52) U.S. Cl.
CPC .......... *H02H 1/0007* (2013.01); *H01H 71/04* (2013.01); *H01H 77/00* (2013.01); *H02H 5/04* (2013.01)

(58) Field of Classification Search
None
See application file for complete search history.

(56) References Cited

U.S. PATENT DOCUMENTS

| 1,962,317 A | 6/1934 | James |
| 3,433,886 A | 3/1969 | Myers |
| 3,590,910 A | 7/1971 | Lorenz |
| 3,627,030 A | 12/1971 | Lorenz |
| 3,872,355 A | 3/1975 | Klein |
| 3,972,579 A | 8/1976 | Kohaut et al. |

(Continued)

FOREIGN PATENT DOCUMENTS

| AU | 201716102 | 10/2017 |
| AU | 201716105 | 10/2017 |

(Continued)

OTHER PUBLICATIONS

"International Preliminary Report on Patentability for International Application No. PCT/US2014/040750, Report issued Apr. 19, 2016, Mailed Apr. 28, 2016", 11 pgs.

(Continued)

*Primary Examiner* — Stephen W Jackson
(74) *Attorney, Agent, or Firm* — KPPB LLP

(57) ABSTRACT

Power outlets adapted for installation within an enclosure are provided. Power outlets are provided having a safety interlock adapted to prevent the creation of a hazardous condition within the enclosure as a result of the continued operation of an electrical device within the enclosed space. The safety interlock may include current limiting circuitry and hardware, hazard sensing devices interconnected with (Continued)

such current limiting circuitry and hardware or other circuit breaker switches, and combinations of such safety interlocks.

23 Claims, 24 Drawing Sheets

(56) References Cited

U.S. PATENT DOCUMENTS

| | | | |
|---|---|---|---|
| 4,200,862 | A | 4/1980 | Campbell et al. |
| 4,332,137 | A | 6/1982 | Hayes, Jr. |
| 4,551,577 | A | 11/1985 | Byrne |
| D285,787 | S | 9/1986 | Schwartz |
| 4,658,577 | A | 4/1987 | Klein |
| 4,659,909 | A | 4/1987 | Knutson |
| 4,737,769 | A | 4/1988 | Masot |
| D299,422 | S | 1/1989 | Brunius et al. |
| 4,901,060 | A | 2/1990 | Liu |
| 5,015,337 | A | 5/1991 | Fraser |
| D317,687 | S | 6/1991 | Fabius et al. |
| 5,023,396 | A | 6/1991 | Bartee et al. |
| 5,143,552 | A | 9/1992 | Moriyama |
| 5,169,418 | A | 12/1992 | Honda et al. |
| 5,306,999 | A | 4/1994 | Hoffman |
| 5,318,453 | A | 6/1994 | Hwang et al. |
| 5,508,568 | A | 4/1996 | Mammen |
| 5,625,345 | A | 4/1997 | Stark et al. |
| 5,742,464 | A | 4/1998 | Ceola et al. |
| 5,949,779 | A | 9/1999 | Mostafa et al. |
| 5,956,487 | A | 9/1999 | Venkatraman et al. |
| 5,995,400 | A | 11/1999 | Park et al. |
| 6,028,267 | A | 2/2000 | Byrne |
| 6,049,143 | A | 4/2000 | Simpson et al. |
| 6,070,742 | A | 6/2000 | McAnally et al. |
| 6,086,390 | A | 7/2000 | Haut |
| D436,837 | S | 1/2001 | Beal et al. |
| 6,198,479 | B1 | 3/2001 | Humpleman et al. |
| 6,216,778 | B1 | 4/2001 | Corwin et al. |
| 6,290,518 | B1 | 9/2001 | Byrne et al. |
| 6,336,691 | B1 | 1/2002 | Maroney |
| 6,370,448 | B1 | 4/2002 | Eryurek |
| 6,377,458 | B1 | 4/2002 | Morris et al. |
| 6,380,852 | B1 | 4/2002 | Hartman |
| 6,435,903 | B1 | 8/2002 | Nelson |
| 6,440,221 | B2 | 8/2002 | Shamouilian et al. |
| 6,446,941 | B1 | 9/2002 | Maheshwari et al. |
| 6,467,286 | B2 | 10/2002 | Hasebe et al. |
| 6,478,587 | B2 | 11/2002 | Sharples et al. |
| 6,530,806 | B2 | 3/2003 | Nelson et al. |
| 6,582,296 | B2 | 6/2003 | Komiyama |
| 6,819,563 | B1 | 11/2004 | Chu et al. |
| 6,859,366 | B2 | 2/2005 | Fink |
| 6,886,361 | B2 | 5/2005 | Flynn |
| D505,858 | S | 6/2005 | O'Keene |
| D507,477 | S | 7/2005 | Pfister |
| 6,942,502 | B2 | 9/2005 | Sharples et al. |
| 6,979,209 | B2 | 12/2005 | Griepentrog et al. |
| 7,078,623 | B1 | 7/2006 | Sheehan et al. |
| D532,376 | S | 11/2006 | Bazayev et al. |
| 7,152,426 | B1 | 12/2006 | Cowans |
| 7,154,402 | B2 | 12/2006 | Dayoub |
| D535,255 | S | 1/2007 | Bazayev et al. |
| 7,163,409 | B1 | 1/2007 | Huang et al. |
| 7,173,820 | B2 | 2/2007 | Fink et al. |
| 7,198,514 | B1 | 4/2007 | Grimes |
| D542,223 | S | 5/2007 | Bazayev et al. |
| 7,262,830 | B2 | 8/2007 | Shigaraki |
| 7,273,215 | B1 | 9/2007 | Smith |
| 7,285,733 | B2 | 10/2007 | Bowman et al. |
| D559,087 | S | 1/2008 | Ciungan |
| 7,327,246 | B2 | 2/2008 | Schoor |
| D577,729 | S | 9/2008 | Derry et al. |
| 7,445,300 | B2 | 11/2008 | Collins et al. |
| 7,505,237 | B2 | 3/2009 | Baxter |
| D595,229 | S | 6/2009 | LaGrotta |
| 7,575,467 | B2 | 8/2009 | Ferguson |
| 7,626,120 | B1 | 12/2009 | Golden et al. |
| 7,736,178 | B2 | 6/2010 | Byrne et al. |
| 7,761,555 | B1 | 7/2010 | Bishel |
| 7,806,091 | B2 | 10/2010 | Esau et al. |
| 7,824,185 | B2 | 11/2010 | Chien |
| 7,837,483 | B2 | 11/2010 | Haut et al. |
| 7,934,932 | B1 | 5/2011 | Lee et al. |
| 7,938,174 | B2 | 5/2011 | Yanagida et al. |
| 7,967,616 | B1 | 6/2011 | Lee et al. |
| D640,982 | S | 7/2011 | Dixon et al. |
| 7,978,447 | B2 | 7/2011 | Baxter |
| 7,999,419 | B2 | 8/2011 | Drane et al. |
| 8,000,074 | B2 | 8/2011 | Jones et al. |
| 8,057,243 | B2 | 11/2011 | Lee et al. |
| 8,068,034 | B2 | 11/2011 | Shah et al. |
| 8,084,992 | B2 | 12/2011 | Scheffy et al. |
| 8,139,337 | B2 | 3/2012 | Baxter et al. |
| 8,238,070 | B2 | 8/2012 | Kopelman |
| 8,277,233 | B2 | 10/2012 | Su |
| D674,753 | S | 1/2013 | Jansen et al. |
| 8,348,683 | B2 | 1/2013 | Row et al. |
| 8,351,200 | B2 | 1/2013 | Arimilli et al. |
| 8,450,879 | B2 | 5/2013 | Chilvers |
| D686,577 | S | 7/2013 | Flagello |
| 8,475,186 | B1 | 7/2013 | Sikkema et al. |
| 8,482,884 | B2 | 7/2013 | Hennessey, Jr. |
| 8,604,935 | B2 | 12/2013 | Shah et al. |
| 8,605,402 | B2 | 12/2013 | Ward |
| 8,622,481 | B2 | 1/2014 | Niederriter |
| D707,109 | S | 6/2014 | Leung |
| 9,136,653 | B2 | 9/2015 | Dickey |
| 9,331,430 | B2 * | 5/2016 | Dickey ............... H01R 35/02 |
| D765,033 | S | 8/2016 | Oosterman et al. |
| 9,578,779 | B2 | 2/2017 | Yi |
| D796,519 | S | 9/2017 | Hung |
| 10,003,159 | B2 | 6/2018 | Dickey |
| D822,671 | S | 7/2018 | Chu |
| D825,469 | S | 8/2018 | Pan et al. |
| D839,829 | S | 2/2019 | Weeks |
| D840,349 | S | 2/2019 | Weeks |
| D841,592 | S | 2/2019 | Dickey |
| 10,205,283 | B2 | 2/2019 | Dickey |
| D843,321 | S | 3/2019 | Dickey |
| D844,563 | S | 4/2019 | Dickey |
| D844,564 | S | 4/2019 | Dickey |
| D856,935 | S | 8/2019 | Pan et al. |
| D878,298 | S | 3/2020 | Pan et al. |
| D909,309 | S | 2/2021 | Pan et al. |
| D964,939 | S | 9/2022 | Chen |
| D999,742 | S | 9/2023 | Dickey |
| 2001/0044161 | A1 | 11/2001 | Komiyama |
| 2002/0043978 | A1 | 4/2002 | McDonald |
| 2002/0064572 | A1 | 5/2002 | Minogue |
| 2003/0159307 | A1 | 8/2003 | Sago et al. |
| 2004/0035569 | A1 | 2/2004 | Suenaga et al. |
| 2004/0112584 | A1 | 6/2004 | Weng |
| 2004/0231351 | A1 | 11/2004 | Wyatt et al. |
| 2006/0006838 | A1 | 1/2006 | Clarke |
| 2006/0081390 | A1 | 4/2006 | Lange et al. |
| 2007/0000641 | A1 | 1/2007 | Yanagida et al. |
| 2007/0052380 | A1 | 3/2007 | Lai |
| 2007/0230126 | A1 | 10/2007 | Pautsch et al. |
| 2007/0233781 | A1 | 10/2007 | Starr et al. |
| 2008/0035307 | A1 | 2/2008 | Yamakawa |
| 2008/0110610 | A1 | 5/2008 | Lifson et al. |
| 2009/0142947 | A1 | 6/2009 | Byrne et al. |
| 2009/0167537 | A1 | 7/2009 | Feliss |
| 2009/0197352 | A1 | 8/2009 | Ueno et al. |
| 2009/0201145 | A1 | 8/2009 | Vasquez |
| 2010/0033024 | A1 | 2/2010 | Crucs |
| 2010/0073839 | A1 | 3/2010 | Baxter et al. |
| 2010/0124849 | A1 | 5/2010 | Winstanley et al. |
| 2010/0200263 | A1 | 8/2010 | Tseng |
| 2010/0273114 | A1 | 10/2010 | Yoshida |
| 2010/0330896 | A1 | 12/2010 | Ohba et al. |
| 2011/0056675 | A1 | 3/2011 | Barringer et al. |
| 2011/0117760 | A1 | 5/2011 | Winstanley et al. |
| 2011/0177703 | A1 | 7/2011 | Lin et al. |

(56) References Cited

U.S. PATENT DOCUMENTS

| | | |
|---|---|---|
| 2011/0239028 A1 | 9/2011 | Higuma et al. |
| 2012/0043943 A1 | 2/2012 | Dyer et al. |
| 2012/0187746 A1 | 7/2012 | Niederriter |
| 2012/0241135 A1 | 9/2012 | Takigawa et al. |
| 2013/0048580 A1 | 2/2013 | Bailey et al. |
| 2014/0077042 A1 | 3/2014 | Niederriter |
| 2015/0108832 A1 | 4/2015 | Dickey |
| 2015/0372423 A1 | 12/2015 | Dickey |
| 2015/0380886 A1 | 12/2015 | Oosterman et al. |
| 2016/0211615 A1 | 7/2016 | Dickey |
| 2018/0301849 A1 | 10/2018 | Dickey |
| 2019/0341757 A1 | 11/2019 | Losaw |

FOREIGN PATENT DOCUMENTS

| | | |
|---|---|---|
| CA | 2730698 A1 | 2/2010 |
| CN | 2256603 Y | 6/1997 |
| CN | 202664713 U | 1/2013 |
| CN | 202917882 U | 5/2013 |
| EM | 004394666-0001 | 10/2017 |
| EM | 004394666-0002 | 10/2017 |
| EM | 005624822-0001 | 8/2018 |
| EM | 005624822-0002 | 8/2018 |
| EP | 2142040 A2 | 1/2010 |
| EP | 2896574 A1 | 7/2015 |
| JP | 10211037 A | 8/1998 |
| JP | 4400918 B2 | 1/2010 |
| KR | 100813683 B1 | 3/2008 |
| KR | 300738671.0001 | 5/2014 |
| WO | 198700976 A1 | 2/1987 |
| WO | 2007022490 A2 | 2/2007 |
| WO | 2007139918 A2 | 12/2007 |
| WO | 2008021639 A2 | 2/2008 |
| WO | 2008133798 A2 | 11/2008 |
| WO | 2015057276 A1 | 4/2015 |
| WO | D0098704-002 | 11/2017 |

OTHER PUBLICATIONS

"International Search Report and Written Opinion for International Application No. PCT/US2014/040750, report completed Sep. 15, 2014, Mailed Oct. 24, 2014", 11 pgs.

"Amazon.com: Docking Drawer 0290-20533W-AUS Trio-Aus in Drawer Outlet", Published May 1, 2018, 1 pg.

"Amazon.com: Docking Drawer Blade Duo 0290-30100W in Drawer Charging Outlet (White)", Published Aug. 1, 2018, 1 pg.

"Amazon.com: Docking Drawer Blade In-Drawer Charging Outlet featuring 2AC and 2 USB Ports", Published Apr. 9, 2018, 1 pg.

"Amazon.com: Docking Drawer Style Drawer 21 Flush In-Drawer Power Outlet with Thermostatic Shutoff", Published Mar. 24, 2017, 1 pg.

"Amazon.com: Docking Drawer USB Narrow In-Drawer Charging Outlet (White) with 4 USB Ports", Published Aug. 1, 2018, 1 pg.

"Docking Drawer Safety Interlock Outlet with Blade Limit Switch", first accessed Oct. 13, 2022. Docking Drawer.com [https://dockingdrawer.com/products/docking-drawer-safety-interlock-outlet-with-blade limit-switch], 2 pgs.

"Docking Drawer Safety Interlock Outlet with Smoke and Heat Sensor", first accessed Oct. 13, 2022. Docking Drawer.com [https://dockingdrawer.com/products/safety-interlock-outlet-with-smoke-and-heatsensor?variant=40449767505963], 2 pgs.

"Leviton GFNT1-W Self-Test SmartlockPro Slim GFCI Non-Tamper-Resistant Receptacle with LED Indicator, Wallplate Included, 15—Amp, White", first available Aug. 5, 2015. Amazon.com [https://www.amazon.com/dp/B0130VCB58], 9 pgs.

"Yopotika 4 Switch Control 5V 2.1A/1A 4100mA USB Wall Mounted Socket Charger Outlet(220-250V)1 USB Outlet USB Wall Socket 4 USB Wall Socket USB Wall Socket USB Outlet 4 USB Wall Socket USB Wall Socket", first available Sep. 21, 2022. Amazon.com [https://www.amazon.com/dp/B0BGQ2CF4C], 4 pgs.

Lindvall et al., "Fracture Mechanics for a Heat Exchanger Gasket", retrieved from https://www.lth.se/fileadmin/lth/student/Maskinteknik/Filer/Examensarbete/Lindvall_Minkkinen.pdfwww.byggmek.lth.se], 2004, 7 pgs.

\* cited by examiner

Installs into a single gang junction box with a sensor near the device that can be a source of excessive heat. It will de-energize the outlet that is separated from the potential source of excessive heat Installs into a dual gang junction box Installs into a single gang junction box

SAFETY INTERLOCKS FOR OUTLETS

CROSS-REFERENCE TO RELATED APPLICATIONS

The current application claims priority under 35 U.S.C. 119(e) to U.S. Provisional Patent Application Ser. No. 63/266,666, entitled "Safety Interlocks for Outlets", filed Jan. 11, 2022. The disclosure of U.S. Provisional Patent Application Ser. No. 63/266,666 is hereby incorporated herein by reference in its entirety.

FIELD OF THE INVENTION

The current invention is directed generally to enclosed power outlets; and more particularly to electrical power outlets that incorporate safety interlocks.

BACKGROUND OF THE INVENTION

Electrical power outlets, and in particular alternating current (AC) power sockets are devices that allow electrically operated equipment to be connected to the primary alternating current power source in a building. Electrical outlets can differ in voltage and current rating, as well as in the shape, size and type of connector they are adapted for use with. The types used in each country are set by national standards, some of which are listed in the IEC technical report TR 60083, the disclosure of which is incorporated herein by reference. Plugs and socket-outlets for domestic and similar general use standardized in member countries of IEC, the NEC also governs electrical in the US.

Regardless, of the specific design and technical specification, a power outlet is typically formed of one or more sockets, which are fixed on a piece of equipment or a building structure and connected to an energized electrical circuit, and are adapted to cooperate with a removable connector attached to an electrically operated device. The sockets are designed to prevent exposure of bare energized contacts. To reduce the risk of failure or user misuse, power outlet systems often incorporate both physical safety features, such as, for example, recessed slots or holes, insulated sleeves, blocking shutters, orientation control; as well as electrical safety features, such as, for example, a protective earth connection to isolate a faulty appliance from the source.

Despite the advanced development of power outlets, a need still exists for electrical power outlets adapted specifically for installation within an enclosed structure, such as a cabinet or piece of furniture.

SUMMARY OF THE INVENTION

The current invention is directed generally to code compliant power outlet assemblies that can be placed within an enclosed structure.

In some embodiments, the invention is directed to a power outlet assembly for an enclosure including:
at least one power outlet; and
at least one safety interlock having at least one sensor capable of detecting at least one hazardous condition within the environment, the at least one safety interlock being adapted to prevent the flow of electrical current between the at least one power source and the at least one power outlet upon detection of one or more of the at least one hazardous conditions;
wherein the safety interlock and outlet are collocated within a single standard junction box.

In still some embodiments, the at least one safety interlock has a hazard sensor selected from the group consisting of a smoke detector, heat detector, and toxic gas monitor.

In yet some embodiments, the heat detector comprises a thermostat.

In still yet some embodiments, the power outlet assembly comprises at least two safety interlocks.

In yet still some embodiments, the outlet further includes a current limiting safety interlock adapted to prevent the flow of current above a specified amperage from the power source to the power outlet.

In still yet some embodiments, the outlet further includes a transformer in electrical connection with the power source and adapted to convert the incoming electrical current from AC to DC.

In yet still some embodiments, the outlet further includes a transmitter in signal communication with the at least one safety interlock for communicating the status of the power outlet assembly to a user.

In still yet some embodiments, the transmitter is configured to automatically transmit upon activation of any one of the at least one safety interlocks.

In yet still some embodiments, the outlet further includes the single standard junction box is one of either single gang or dual gang.

In still yet some embodiments, at least one of the at least two safety interlocks comprises a positional safety interlock, the positional safety interlock configured to detect the position of the power outlet assembly relative to a specified point external to the power outlet assembly.

In yet still some embodiments, the outlet further includes the single standard junction box is one of either single gang or dual gang.

In still yet some embodiments, the outlet assembly further comprises a hazard connector, and wherein the hazard sensor is located external to the outlet assembly and is configured to be interconnected to said outlet assembly through said hazard connector.

In various embodiments the invention is directed to a power equipped enclosure including:
an enclosure defining an internal volume, said internal volume being accessible;
at least one power outlet disposed within the internal volume of the enclosure; and
at least one safety interlock having at least one sensor collocated within the enclosure and capable of detecting at least one hazardous condition within the environment of said enclosure, the at least one safety interlock being adapted to prevent the flow of electrical current between the at least one power source and the at least one power outlet upon detection of one or more of the at least one hazardous condition;
wherein the safety interlock and outlet are disposed within a single standard junction box.

In still various embodiments, the at least one safety interlock has a hazard sensor selected from the group consisting of a smoke detector, heat detector, and toxic gas monitor.

In yet various embodiments, the heat detector comprises a thermostat.

In still yet various embodiments, the power outlet assembly comprises at least two safety interlocks.

In yet still various embodiments, the enclosure further includes a current limiting safety interlock adapted to prevent the flow of current above a specified amperage from the power source to the power outlet.

In still yet various embodiments, the enclosure further includes a transformer in electrical connection with the power source and adapted to convert the incoming electrical current from AC to DC.

In yet still various embodiments, the enclosure further includes a transmitter in signal communication with the at least one safety interlock for communicating the status of the power outlet assembly to a user.

In still yet various embodiments, the transmitter is configured to automatically transmit upon activation of any one of the at least one safety interlocks.

In yet still various embodiments, the enclosure further includes the single standard junction box is one of either single gang or dual gang.

In still yet various embodiments, the enclosure further includes at least one of the at least two safety interlocks comprises a positional safety interlock, the positional safety interlock configured to detect the position of the power outlet assembly relative to a specified point external to the power outlet assembly.

In yet still various embodiments, the enclosure further includes the specified point is disposed on a movable portion of the enclosure.

In still yet various embodiments, the outlet assembly further comprises a hazard connector, and wherein the hazard sensor is located external to the outlet assembly and is configured to be interconnected to said outlet assembly through said hazard connector.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims of the current invention will be more fully understood with reference to the following figures, which are presented as exemplary embodiments of the invention and should not be construed as a complete recitation of the scope of the invention, wherein:

DETAILED DESCRIPTION OF THE INVENTION

Figure 1:
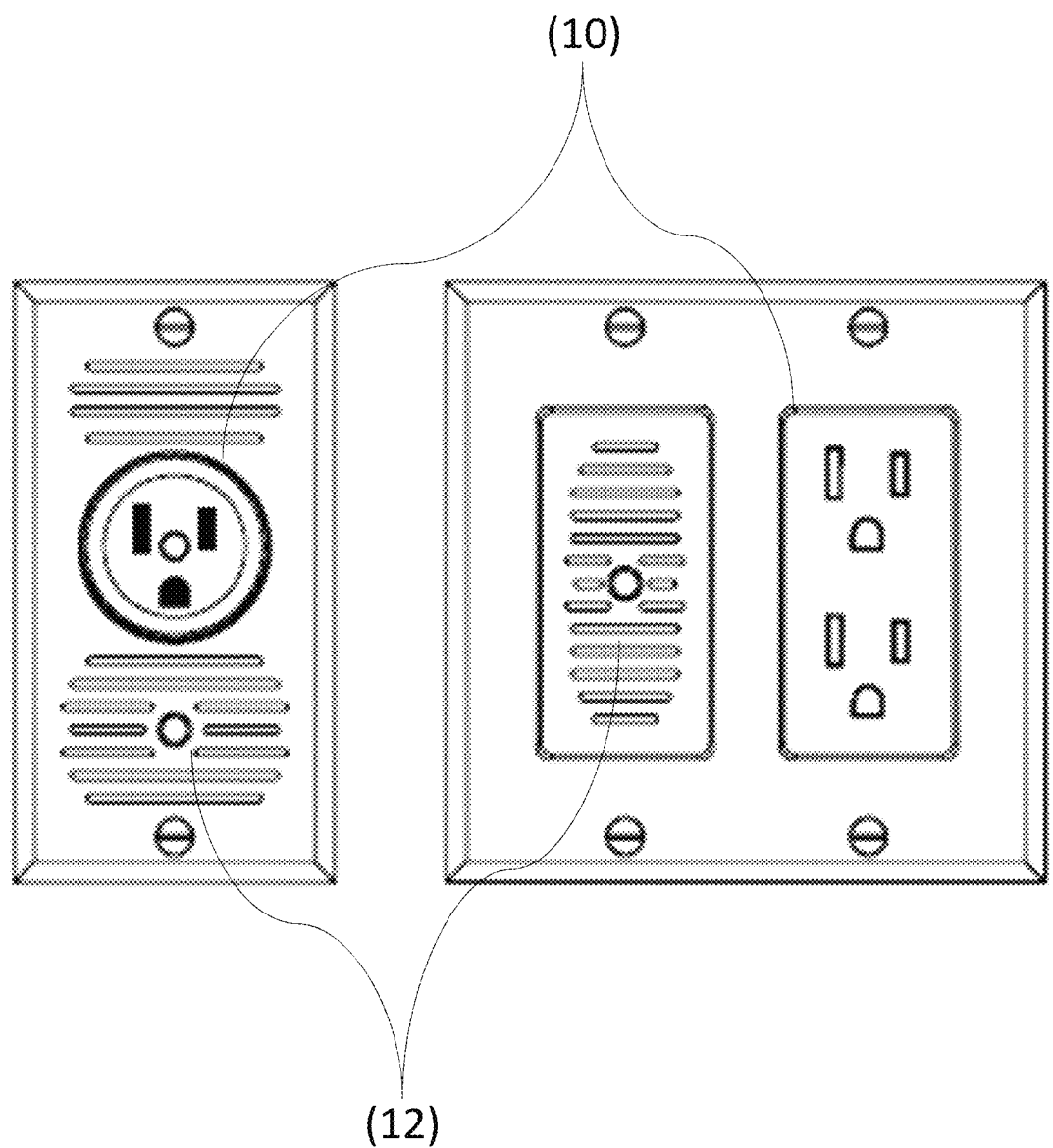
FIG. 1 provides schematics of safety interlock power outlet assemblies in accordance with many embodiments.

Turning to the figures and schematics, safety interlocks configured to be disposed within a standard outlet box and configured to prevent the creation of a hazardous condition as a result of the continued operation of an electrical device are provided. In some embodiments, the safety interlock may include current limiting circuitry and hardware, hazard sensing devices interconnected with such current limiting circuitry and hardware or other circuit breaker switches, positional sensing devices interconnected with such current limiting circuitry and hardware, and combinations of such safety interlocks. In many embodiments the power outlet may be adapted for installation within a stationary enclosure, such as, for example, a cabinet, or a movable enclosure, such as, for example, a drawer. In many embodiments the power outlets may be adapted to provide a current suitable only for low amp requirements, such as, for example, for the charging of electronic devices. In other embodiments the power outlets may be adapted to provide a current suitable for standard electrical devices, such as, for example, electrical bathroom appliances like hairdryers, curling irons, heated curlers, etc.

It has long been realized that mounting power outlets within enclosures can create arrangements with a great deal of utility, for example, by providing interior lighting, temperature control, or simply power availability for charging or operating electrical devices within, for example, an enclosed cabinet, drawer, etc. Accordingly, many attempts have been made to integrate power outlets within a variety of enclosures, including, for example, drawers, storage chests and cabinets. (See, e.g., U.S. Pat. No. 8,084,992; PCT Pub. No. WO2007139918; PCT Pub. No. 2007022490, and EP Pub. No. 2142040, the disclosures of each of which are incorporated herein by reference.) However, in designing these power integrated enclosures, structures and equipment, little thought has thus far been given to mitigating the inherent hazards created by this power equipment, particularly in the case of general purpose power outlets to which any electrical device or appliance, including unauthorized or non-recommended devices and appliances, may be connected, and which may thus give rise to unexpected hazards when powered-on or left unattended in a powered-on state within the enclosure. In particular, while many of these devices may include safety systems capable of detecting an electrical fault in the system, such as a ground or arc fault, or some other kind of short-circuit, none have considered methods and systems for detecting hazards that may be created within an enclosure from the proper operation of an electrical device/appliance.

This is problematic, as in accordance with regulations in most countries, including the United States, individuals may face liability for negligently creating a hazardous situation from an electrical installation that results in loss of life or property. To avoid such liability it is, therefore, important to follow a standard set of building and electrical code laws, such as those issued, for example, in the United States in the National Electrical Code (NEC), which is itself part of the National Fire Codes published by the National Fire Protection Association (NFPA). Electrical devices and appliances also have to be designed, manufactured, tested or inspected, and marked in accordance with requirements of an appropriate listing agency, such as, for example the Underwriters Laboratories (UL), MET Laboratories, Inc. (MET), Intertek Group (ETL), Canadian Standards Association (CSA), and FM Approvals (FM), among others. The absence of such approval means that general purpose power outlets for use and installation in enclosures, though promising for many applications, are not available for widespread use.

Attempts have been made to integrate safety interlocks with outlets, these attempts have required the inclusion of a device external to the outlet, such as, for example, external interlocks as described in U.S. Pat. No. 3,872,355, or in accessories such as power strips as described in U.S. Pat. No. 7,154,402. Such external interlocks require substantial additional cost to install or bulky accessories that limit usable space in applications where the outlets are incorporated into enclosed spaces. Accordingly, in many embodiments, power outlet assemblies are provided that include one or more integrated safety interlocks or interlock connections enclosed within the outlet box and adapted to prevent the creation of a hazard by the operation of electrical devices and appliances while interconnected with the power outlet within an enclosure. FIG. 1 provides schematic diagrams of exemplary outlets in according with embodiments that include an outlet (10) and integrated safety interlock (12) within the same outlet box or in connection via an integrated connector (not shown). As shown, in various embodiments these outlets are configured to ensure that all safety interlocks or interlock connections are enclosed within the standard outlet box footprint making installation easy and space efficient.

Figure 2A:
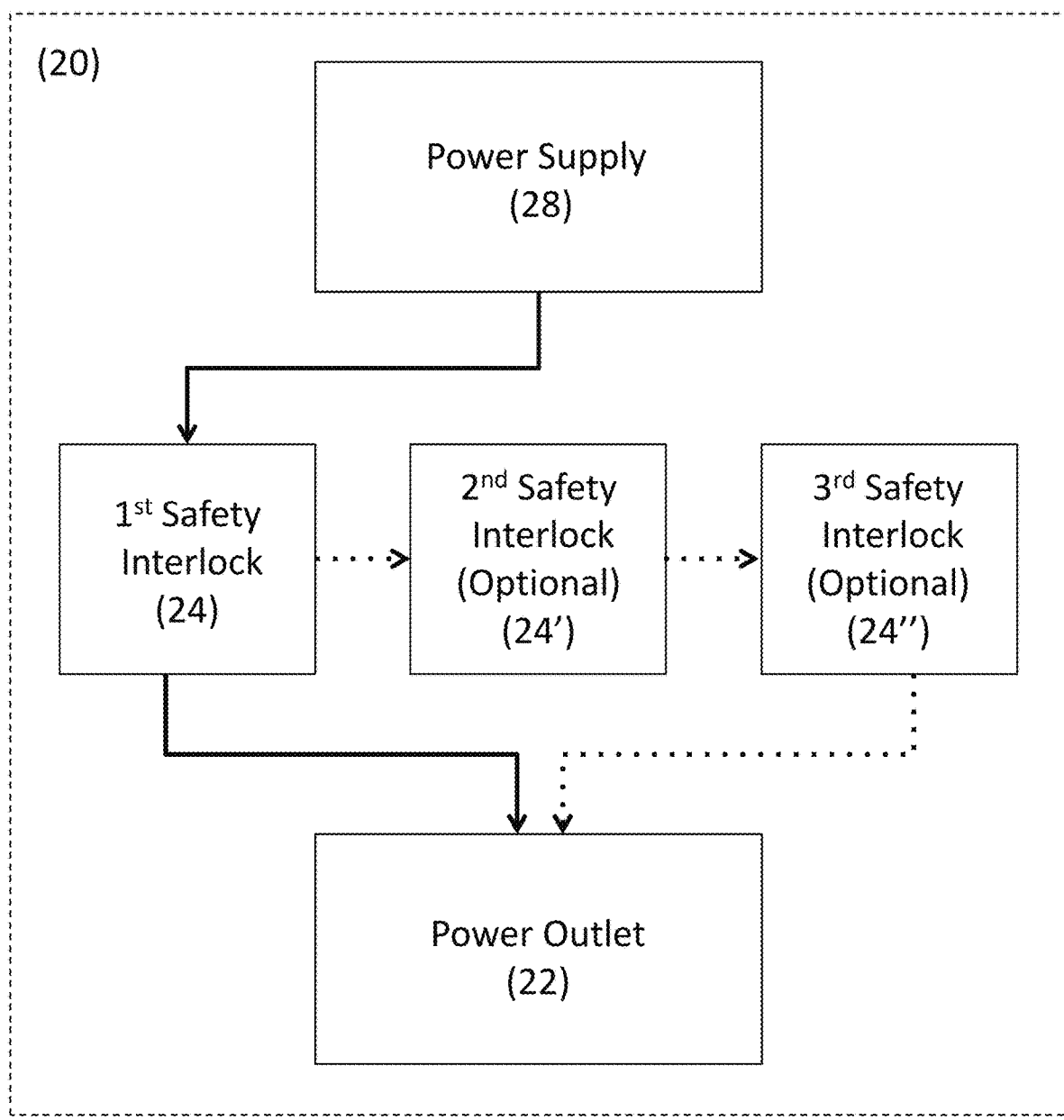
FIGS. 2a and 2b provide schematics of power outlet assembly layouts in accordance with many embodiments.

FIG. 2a provides a generalized schematic diagram showing the operational layout of power outlets in accordance with many embodiments. As shown, the power outlet assembly (20) generally comprises one or more safety interlocks (24, 24', 24") in electrical interconnection between a power outlet (22) and the associated power source (28). In many embodiments, as installed, the power outlet may directly incorporate detectors with the safety interlocks necessary to detect a hazardous condition generated by the operation of the power outlet is disposed within an enclosure to be monitored. Regardless of the number or type of safety interlocks included with the power outlet assembly, each is arranged such that the triggering or activation of a single safety interlock terminates current from the power source to the power outlet. Note, although three safety interlocks are shown in FIG. 2a, it will be understood that any number and arrangement of safety interlocks/connections may be incorporated into the device such that one or more possible hazardous conditions associated with the use or misuse of the power outlet assembly may be prevented.

Figure 2B:
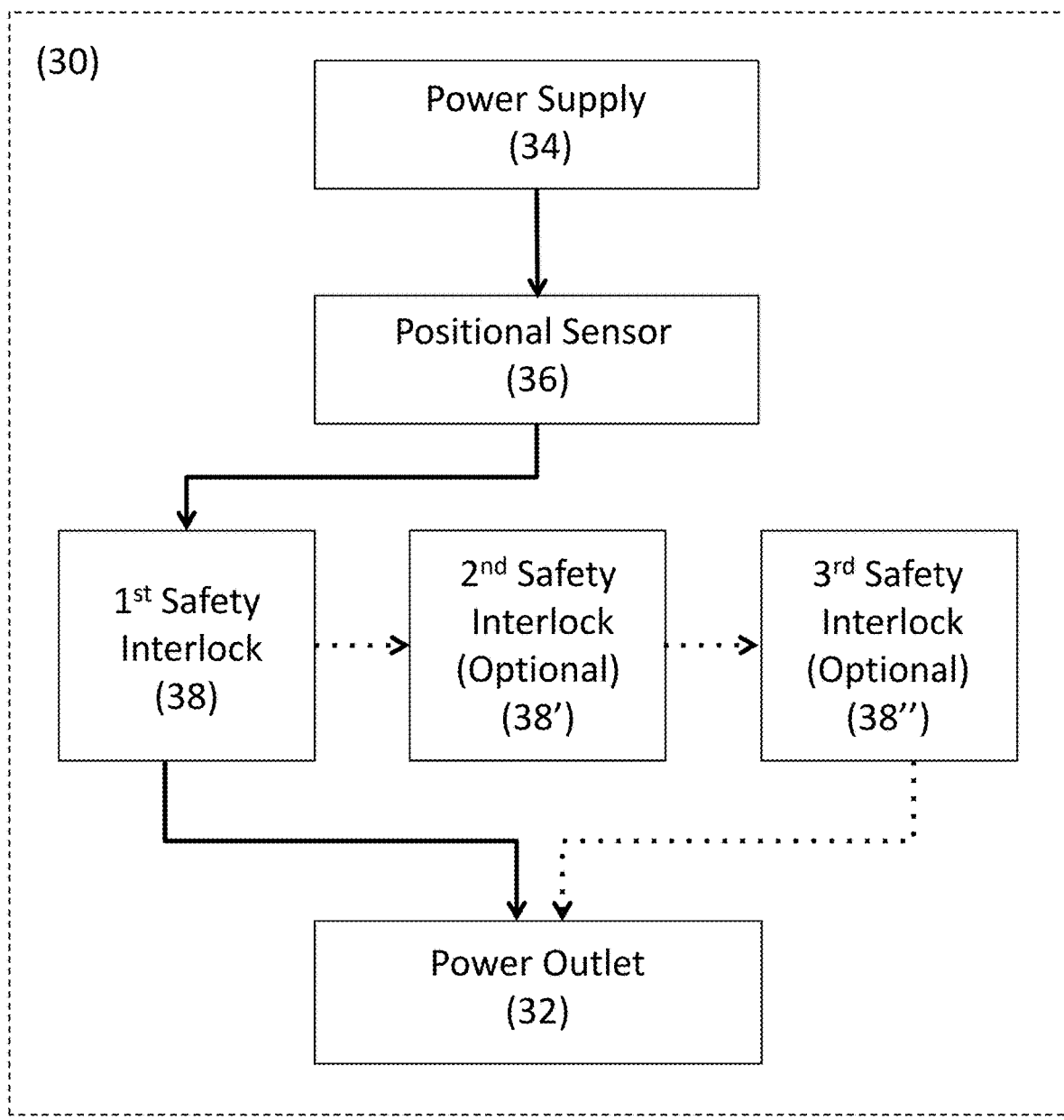

FIG. 2b provides alternative embodiments of power outlet assemblies (30) that incorporate a power outlet (32) that is movable relative to the power source (34). As shown, in such embodiments the assemblies may also incorporate a positional sensor (36) disposed between the incoming power source and the power outlet such that the movement of the outlet to a specified position disconnects the power source from the power outlet. It will be understood that the positional sensor is similarly disposed within the power outlet such that the power outlet is only operational at specific locations to the power source. Such power outlets may further include hazard sensor safety interlocks (38, 38', 38") as described in reference to FIG. 2a, above.

While the above schematics describe a single power outlet, it will be understood that at any enclosure may incorporate any number of power outlets and/or power sources interconnected with any number of electrical interconnections and safety interlocks. Finally, while the above schematics show some generalized features of embodiments of power outlet assemblies, it will be understood that additional electrical and mechanical features and devices may be incorporated into the power outlet assemblies. For example, in embodiments the assembly may include a ground fault circuit interrupter (GFCI) such that the assembly may be used in wet locations, as defined in the NEC code, or it may incorporated an arc-fault circuit interrupter (AFCI) to prevent arcs from hot to neutral that can develop when insulation between wires becomes frayed or damaged. Likewise, the power outlet assembly may include dimmer circuits, illuminated outlet covers, wireless or wire remote control, transmitters, timer circuits, etc.

Definitions

Before proceeding to specific examples of possible power outlet assemblies, some general definitions are provided concerning the subject components.

A power source, for the purposes of embodiments, refers to any type of conduit, housing, wiring or hardware that brings any general-purpose alternating-current (AC) electric power source, such as, for example, household power, household electricity, house current, powerline, domestic power, wall power, line power, AC power, city power, street power, and grid power, into an enclosure. It will be understood that any voltages and frequencies may be used with the power outlet assembly embodiments dependent on the distribution regulations and rules set forth for a particular locale. For example, in one exemplary embodiment the power outlet power source would include a circuit capable of supplying a 120V/10A maximum current, or alternatively 220V or 440V dependent on the requirements of any suitable electric power standard, such as, for example any of those published by the International Electrotechnical Commission (IEC) in the IEC Technical Report 60083, the substance of which is incorporated herein by reference. In addition, the power source may include suitable rectifying circuits for converting or rectifying the AC power from the external source of power into DC power with a standard AC to DC converter that is commonly used to power many devices. Any suitable DC current may be thus provided depending on the power requirements of the device to be powered by the power outlet.

A safety interlock, for the purposes of embodiments, refers to any device, circuit or sensor capable of detecting an unsafe condition or hazard generated by the operation of the enclosed power outlet. Embodiments of such safety interlocks may include mechanical or electromechanical devices adapted to prevent the flow of current through the power outlet, and thus into the electrical device or appliance when the operation of the electrical device or appliance is creating a hazard despite the fact that both the electrical circuit and the electrical device are operating within tolerances. Embodiments of such safety interlocks may include current limiting devices, such as circuit breakers and/or fuses adapted to detect short circuits between the live and neutral wires, or the drawing of more current than the power outlets is rated to handle to prevent overheating and fire. In still other embodiments such safety interlocks may include sensors adapted for detecting a hazardous condition in the environment of the enclosure (such as overheating, smoke, poisonous gas, etc.). Such sensors may incorporate integrated circuit interrupters, or may be interconnected to a circuit interrupter such as a circuit breaker or fuse such that upon detection of a hazardous condition current from the power source to the power outlet could be terminated. Alternatively, the safety interlock may include a circuit interrupter within the outlet that is connected to an external sensor via a suitable connector. Finally, such safety interlocks may include position sensors or switches for activating the safety interlocks only when the enclosure within which the power outlet has been installed is in a configuration (such as a closed condition) in which the device interconnected to the power outlet would be concealed within the enclosure. The system may also include any combination of such safety interlocks.

A power outlet, for the purposes of embodiments, refers to any electrical socket for domestic, commercial and light industrial purposes generally provide any number or arrangement of electrical connections to the supply conductors. For example, the power outlet may include two pin sockets (providing, for example, neutral and line connections), three pin sockets (that provide, in addition, a protective earth connection), some sockets may have two line connections (such as a split phase system having 240 V between line connections each at 120 V with respect to earth ground), or a three-phase system (having, for example, 208 V between contacts and only 120V between each contact and earth ground). This power outlet could also be delivered in any combination of such receptacles, such as, for example, split between one or more standard two or three prong connections, or standard connections and specialized connectors including, USB, thunderbolt, firewire, etc. In addition, although the above discussion and figures show standard in-wall power outlets, it should be understood that embodiments of the invention are also directed to alternative power outlet designs including power strips and the like.

An enclosure, for the purposes of embodiments, may be any structure that defines an internal volume into which the power outlet and any electrical device or appliance interconnected therewith are at least partially enclosed or contained. The enclosure should have at least one opening into the internal volume such that the power outlet may be accessed, such opening may be fixed or may be sealable, such as by a door, drawer, hatch, etc. The enclosure may be fixed, such as a permanently attached cabinet, or may be movable, such as a movable tool chest or other piece of movable furniture, or the enclosure may be fixed or movable and incorporate movable elements into which the power outlet is installed, such as a drawer within a fixed or movable cabinet.

Although not described in the sections above, additional circuits and hardware could be provided to allow for additional functionality including, for example, other power and data connections, as well as interrupts or switches that would turn on or off the circuit based on the relative position of the outlet box to the junction box. In addition, other circuits might be incorporated for the measurement and reporting of power consumption for each receptacle, and either standard or user input thresholds or standards that can be compared against so that a user could be alerted to abnormal or undesirable power situations. In another example, the circuitry might include timing circuitry or light-sensing circuitry that could be used to independently control the power circuitry at the user's direction. It will be understood that these elements are not intended to be limiting, and extensions thereof, as well as other structures and devices capable of incorporation embodiments of power outlet assemblies, will be described below in association with the following exemplary embodiments.

Exemplary Embodiments

The person skilled in the art will recognize that additional embodiments according to the invention are contemplated as being within the scope of the foregoing generic disclosure, and no disclaimer is in any way intended by the following, non-limiting examples.

Power Outlet Assemblies for Enclosure Installation

As described above, one possible hazard that can arise when incorporating a general purpose power outlet into an enclosure, such as a cabinet, is that a user may interconnect an electrical device or appliance that generates heat (such as a hair dryer, curler, etc. in a bathroom cabinet or drawer) and leave that device in operation, and unattended, within the enclosure thus creating a potential fire hazard. Accordingly, many embodiments of power outlet assemblies are configured with safety interlocks adapted to prevent electrical devices and appliances from creating a hazardous condition within an enclosure.

Current Limiting Safety Interlocks

In many embodiments such a safety interlock might include a current limiting device, such as a fuse or circuit breaker that would restrict the total current capable of passing through the power outlet assembly to a level suitable only for low amperage electrical device or appliances, such as for the charging of personal electronics, rechargeable batteries, flashlights, etc. In such embodiments, the power outlet assembly is adapted such that a hazard within the enclosure is incapable of being created.

Figure 3A:
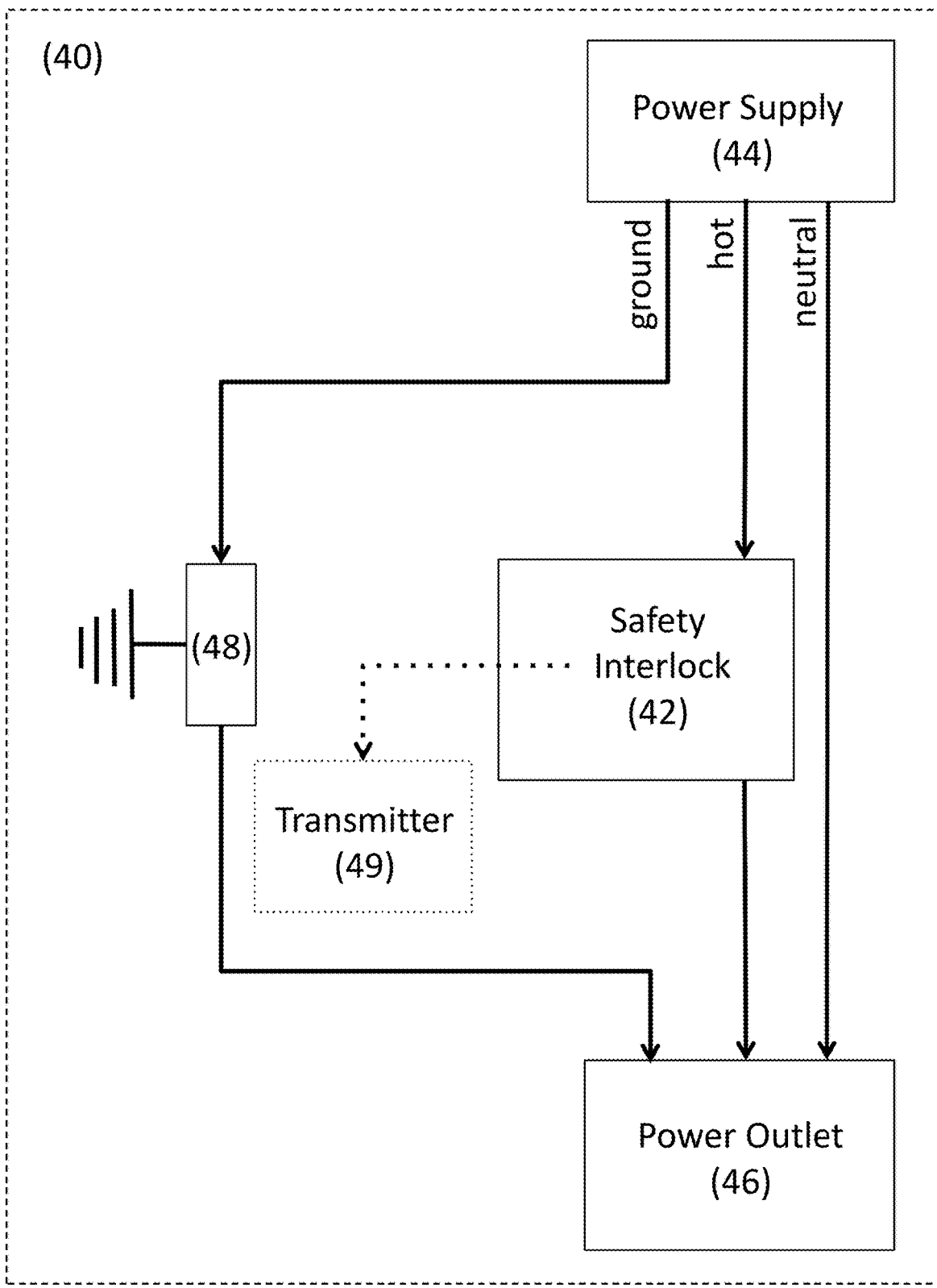
FIG. 3a provides a schematic of power outlet circuitry incorporating a current limiting safety interlock in accordance with many embodiments.

FIG. 3a provides a schematic wiring diagram in accordance with embodiments of such a current limiting power outlet assembly (40). As shown, in some such configurations a current limiting safety interlock (42), such as, for example, a circuit breaker and reset or a fuse, may be interconnected on the hot wire between the power source (44) and power outlet (46) to provide only sufficient power for low voltage and low current recharge of electronic devices. As shown, this safety interlock would be in addition to any standard ground (48). In such embodiments the circuit could be protected, for example, by a 3A circuit breaker so that the whole circuit would be limited to 3A or less, although any suitable current limiting circuit and current level could be implemented. In addition, as many low current applications require DC no AC power, the circuit could also include a suitable rectifier or transformer capable of conditioning the electrical output to suit the specific purpose.

As described above, such a current limiting safety interlock power outlet assembly may include any other suitable or desired circuitry or hardware for additional safety or functionality. In particular, the power outlet assembly may optionally include a transmitter (49) for communicating information about the power outlet usage, as well as the activation of the safety interlock to a user. Such a transmitter may be wireless or wired, and use any message and transmission format desired.

Hazard Sensing Safety Interlocks

Although current limiting the power outlet assembly, as proposed in the embodiments above, is one method of preventing the creation of a hazardous condition within the enclosure, in many embodiments it is necessary and desirable to maintain the power outlet as a general purpose outlet capable of operating a wide variety of electrical devices and appliances, including electrical devices and appliances that require high current (e.g., 15 A and above), including many common kitchen and bathroom appliances, such as, for example, hair dryers, hair curlers, electric toothbrushes, blenders, mixers, etc. Accordingly, in many embodiments power outlet assemblies are provided that incorporate a hazard sensor safety interlock, such that upon detection of a hazardous condition the power from the power source would be interrupted.

Figure 3B:
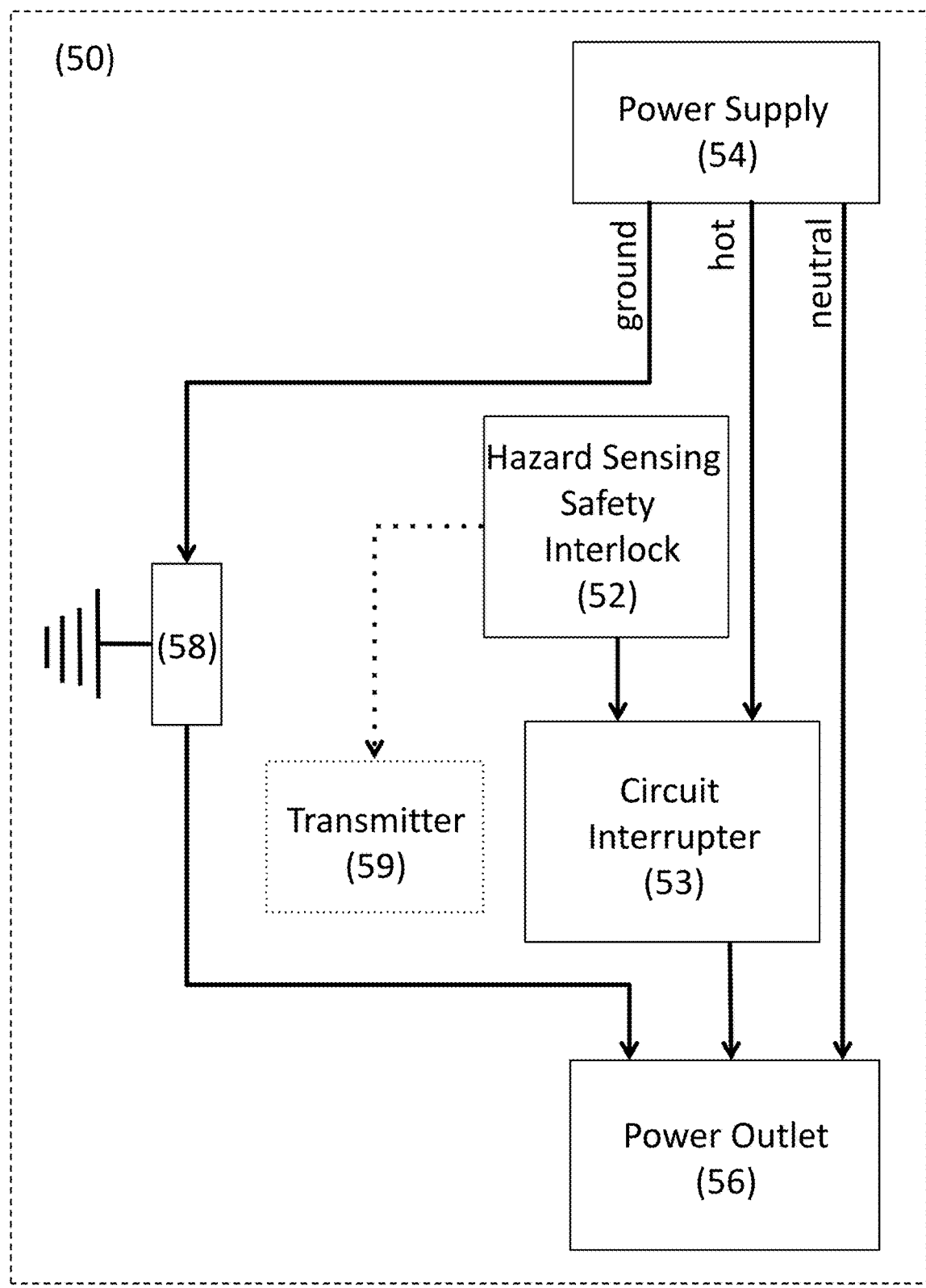
FIG. 3b provides a schematic of power outlet circuitry incorporating a hazard sensor safety interlock in accordance with many embodiments.

FIG. 3b provides a schematic wiring diagram in accordance with embodiments of such a hazard sensing power outlet assembly (50). As shown, in some such configurations a hazard sensing safety interlock (52) is placed in signal communication with a circuit interrupter (53), such as, for example, a circuit breaker, reset or a fuse, itself interconnected on the hot wire between the power source (54) and power outlet (56) such that on detection of a hazardous condition within the environment of the enclosure the circuit interrupter would be triggered thus preventing further power from flowing into the outlet. Although the schematic shows the safety interlock and circuit interrupter as separate devices, in embodiments the two could be combined into a single device. Alternatively, the safety interlock may be external to the outlet box and a signal from the safety interlock may be input into the circuit interrupter via a suitable connector. As above, this safety interlock would be in addition to any standard ground (58), or other standard circuit protective hardware or software.

Turning to the hazard sensing safety interlocks, while there are a number of well-known systems available for detecting and preventing a dangerous electrical condition, such as from a ground or arc fault, from occurring within an electrical circuit, these systems only address issues that arise from an electrical fault, either in the wiring of the outlet or in the operation of the electrical device/appliance attached thereto. However, as discussed above, where an outlet is to be installed within an enclosure, additional hazards can arise even where both electrical circuit and electrical device/appliance are operating satisfactorily. Accordingly, in embodiments a hazard sensor safety interlock is to be understood to refer to a sensor adapted to detect a potential hazardous condition created by the operation of an electrical appliance or device within the enclosure, such as overheating or fire, by monitoring the environment of the enclosure. In some exemplary embodiments the hazard sensor is one of either a smoke, toxic gas (CO, $CO_2$, e.g.) and/or heat sensor. In one exemplary embodiment the heat sensor is comprised of a resettable mechanical thermostat that activates when a specific threshold temperature is reached. In many embodiments a thermostatic sensor may be formed of a temperature sensitive bimetal is disposed within the hazard sensor. Such bimetal elements deform once a threshold temperature is reached. In many embodiments the bimetal element may be disposed in relation to a circuit interrupter such that when the threshold temperature is reached the bimetal element would trigger the circuit interrupter thereby removing electrical current from the power outlet.

Such a hazard sensing safety interlock power outlet assembly may additionally include any other suitable or desired circuitry or hardware for additional safety or functionality. In particular, the power outlet assembly may optionally include a transmitter (59) for communicating information about the power outlet usage, as well as the activation of the safety interlock to a user. Such a transmitter may be wireless or wired, and use any message and transmission format desired.

Although not shown, in some configurations the one or more hazard sensing safety interlocks could be combined with a current limiting safety interlock, such as, for example, the one described in relation to FIG. 3a, along with a rectifier or transformer capable of conditioning the electrical output to suit the specific purpose.

Integrated Safety Interlocks for Power Outlet Assemblies

Although the above discussion has focused on the design of the safety interlock circuitry for use with power outlet assemblies without reference to the assembly itself, in many embodiments the safety interlocks and power outlet assemblies are specifically adapted such that the interlock and outlet are confined within a standard outlet box. In such embodiments, installation of the safety interlock and outlet can be installed simultaneously in immediate proximity without the need for additional space or installation steps.

Figure 4A:
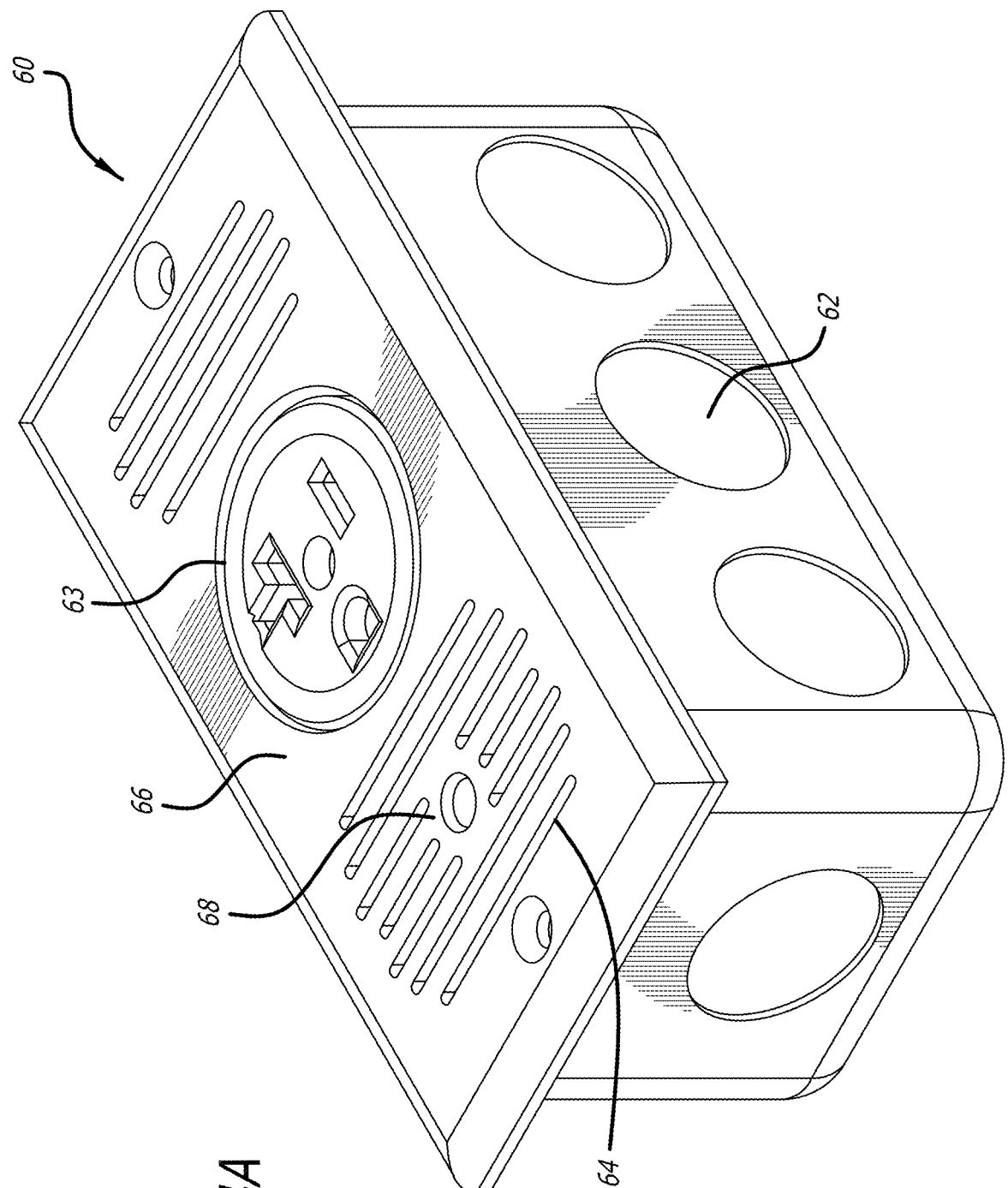
FIGS. 4a and 4b provide schematics of single gang safety interlock power outlet assemblies in accordance with many embodiments.

In accordance with embodiments, as shown in FIG. 4a, integrated safety interlock power outlets (60) comprise generally a standard outlet box (62) having at least one outlet (63) and a safety interlock element (64). A further cover or faceplate (66) is provided to cover the elements within the outlet box. The power outlet may include any suitable power socket (63), such as, for example, two and three prong power sockets, electronic connectors (such as USB, firewire, thunderbolt, etc.), internet connector, and combinations thereof provided sufficient internal and external space is reserved to allow for the inclusion of the safety interlock. The safety interlock according to many embodiments may comprise a resettable safety interlock (68), which may be a current limiting safety interlock or a hazard sensing safety interlock, or a combination thereof, for example, a thermostatic safety interlock that is adapted to de-energize the outlet when the surrounding temperature exceeds a set temperature (e.g., greater than 120° F.).

Figure 4B:
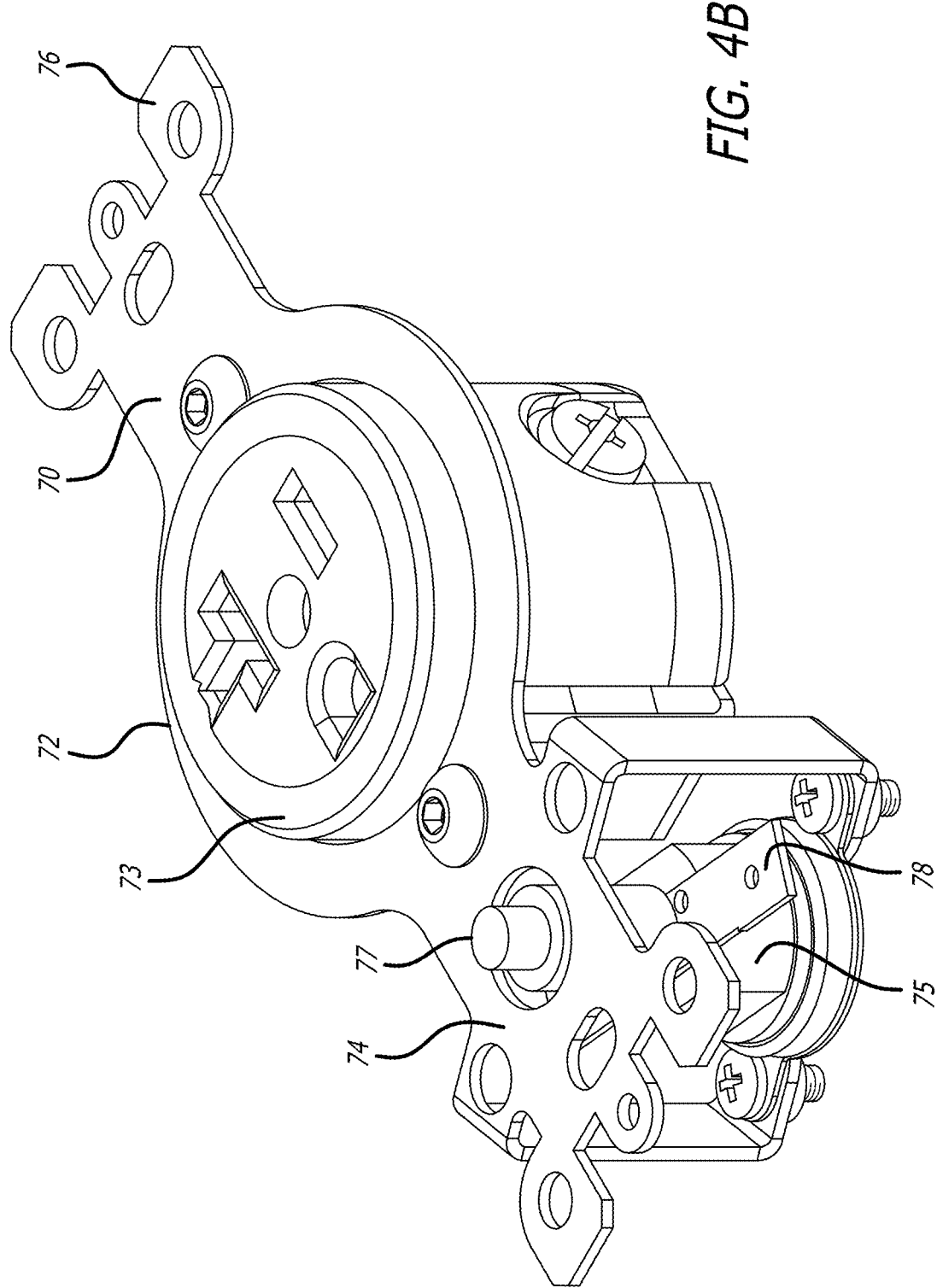

Turning to the internal structure of the integrated safety interlock outlet box, it should be understood that any structure adapted to support and collocate an outlet and a safety interlock may be used. In some embodiments, as shown in FIG. 4b, the integrated safety interlock outlet comprises a support structure (70) having a first portion (72) configured to support an electrical socket element (73), and a second portion (74) configured to support a safety interlock element (75), and fixation elements (76) configured to engage with a standard outlet box. The safety interlock may comprise any suitable hazard sensor. In the embodiment shown in FIG. 4b, the safety interlock comprises a resettable (77) thermostatic element (75) configured to sense a temperature above a set temperature and pair of connectors (78) configured to interconnect with the outlet and de-energize the outlet (73) when the set point exceeded. In embodiments where the safety interlock is resettable the support structure may be configured such that the reset switch is positioned at an opening in the faceplate such that it may be accessed external to the outlet box. Although one possible safety interlock is provided in this exemplary embodiment, it will be understood that other structures and safety interlocks may be utilized as appropriate.

Figure 5:
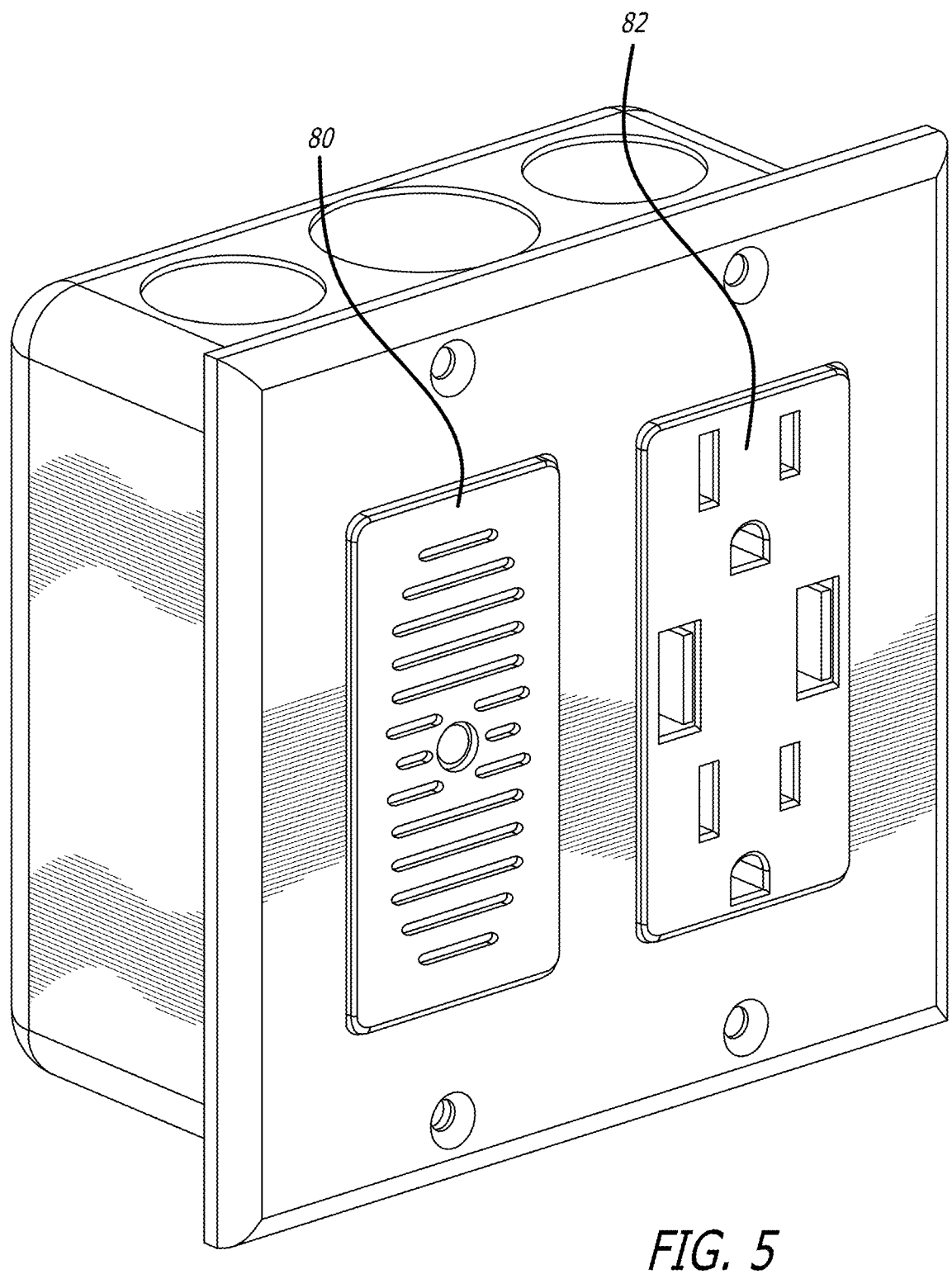
FIG. 5 provides a schematic of a dual gang safety interlock power outlet assembly in accordance with many embodiments.
Figure 6A:
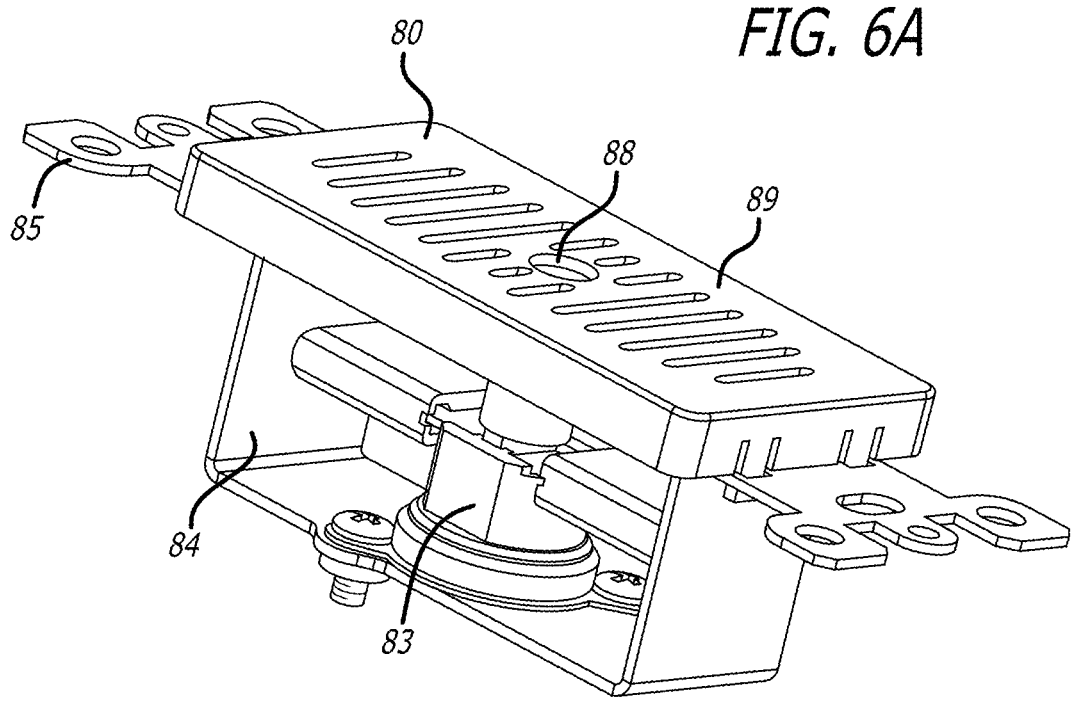
FIGS. 6a to 6c provide schematics of safety interlocks configured for dual or single gang power outlet assemblies in accordance with many embodiments.
Figure 6B:
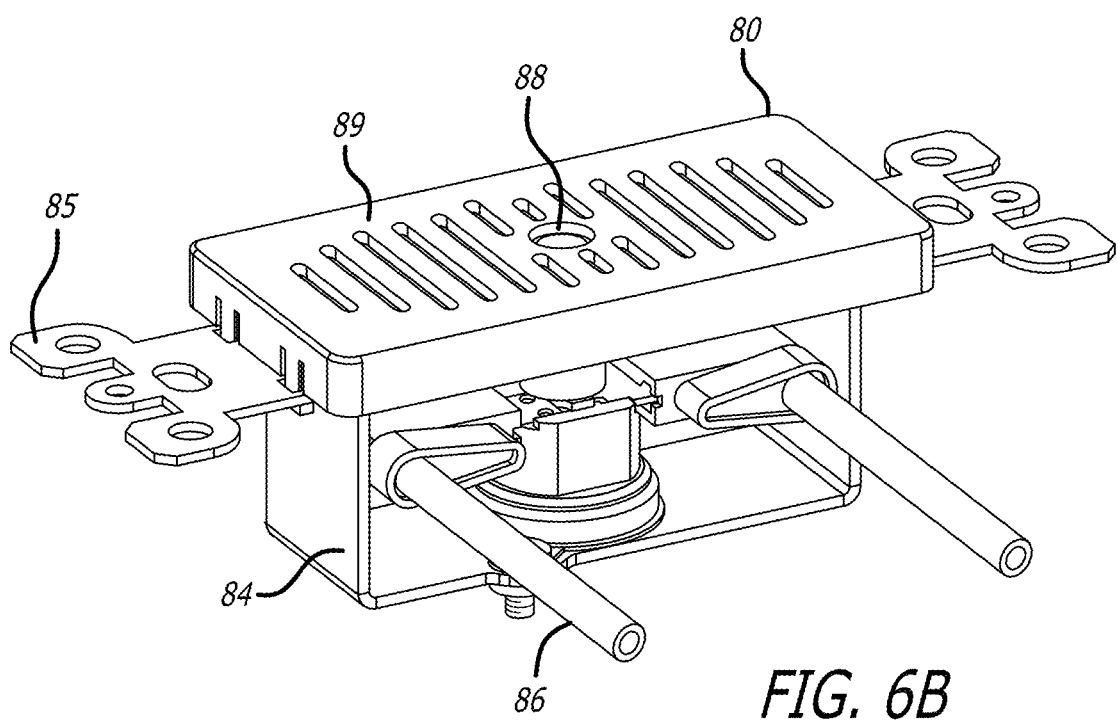
Figure 6C:
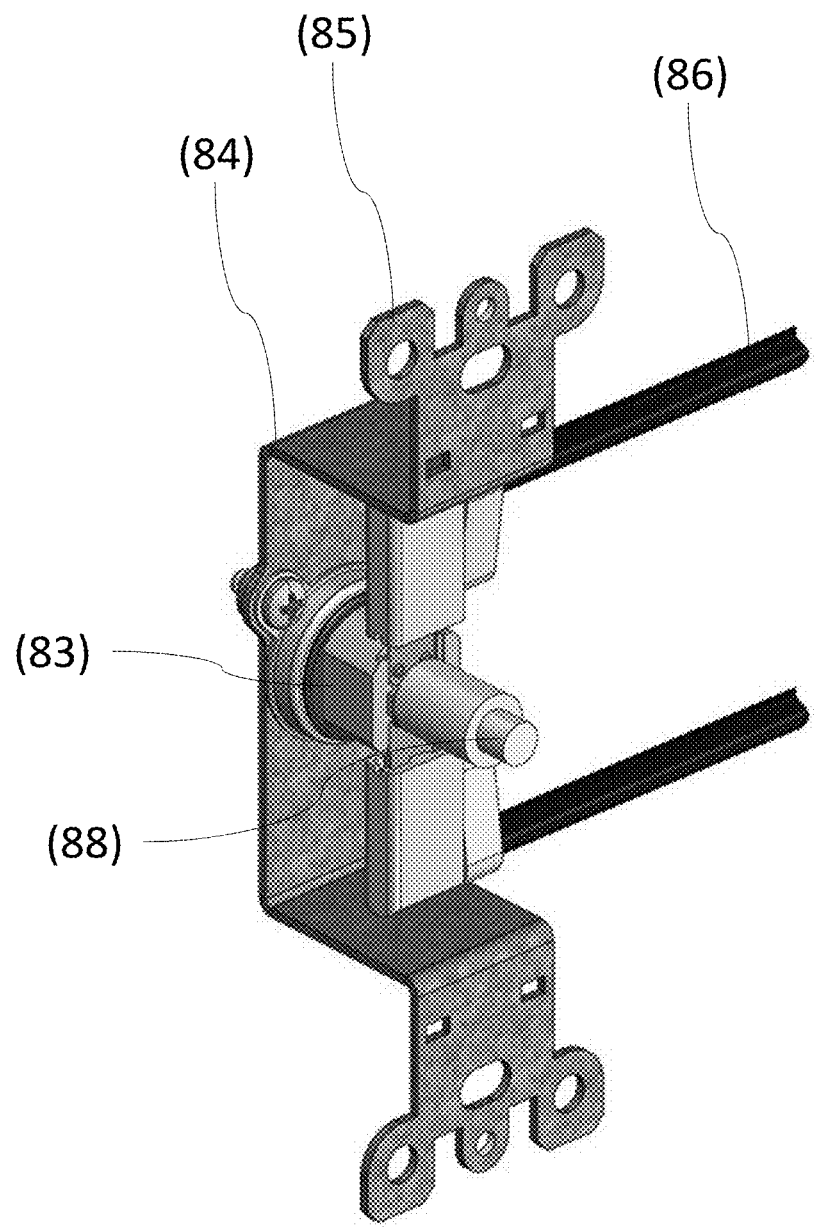

Although the above embodiment depicts an integrated safety interlock outlet in which the safety interlock and outlet are disposed within a single gang configuration, it should be understood that alternative embodiments of such conduits of varying shapes, sizes and configurations may be incorporated into the power outlet assemblies. For example, in various embodiments the safety interlock (80) and outlet (82) may be configured in a dual gang configuration, as shown in FIG. 5. In such embodiments, as shown in FIGS. 6a to 6c, a safety interlock (83), as described above, may be disposed within a framework (84) having a support structure for the safety interlock and fixation elements (85) adapted to fit within a dual gang junction box along with a standard outlet, as shown in FIG. 5. The safety interlock in such embodiments is further provided with electrical connectors (86) configured to interconnect the safety interlock to the adjacent outlet. As previously described, the safety interlock may be resettable and may be configured such that the reset switch (88) is positioned at an opening in the faceplate (89) such that it may be accessed external to the outlet box.

Although the safety interlock in such embodiments is shown in a dual gang configuration in combination with a standard outlet, it should be understood that such a safety interlock may also be positioned within a standard single gang outlet box remote from the outlet. In such an embodiment, the electrical interconnections (86) would be wired to the remote outlet to allow the safety interlock to de-energize the outlet after detection of a hazardous condition.

Figure 7C:
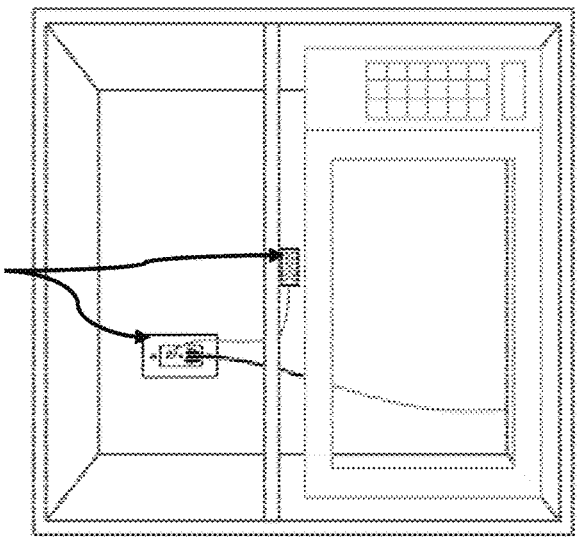
FIGS. 7a to 7c provide schematics of safety interlock outlet installations in accordance with many embodiments.
Figure 7B:
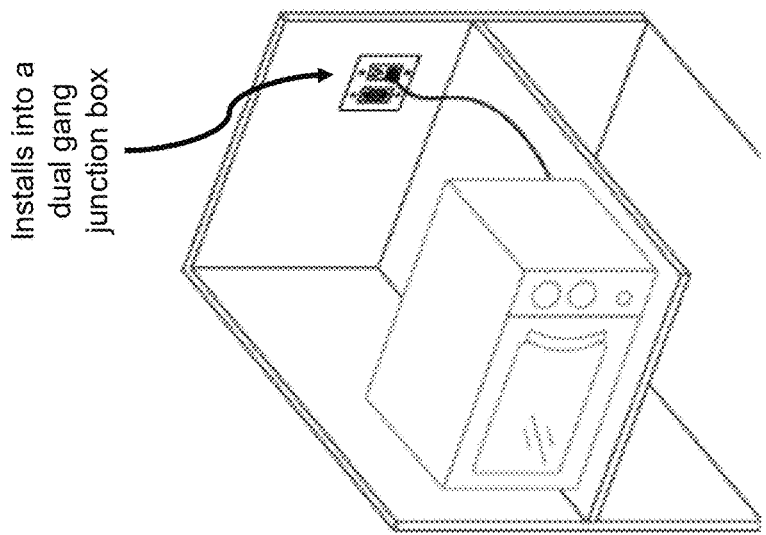
Figure 7A:
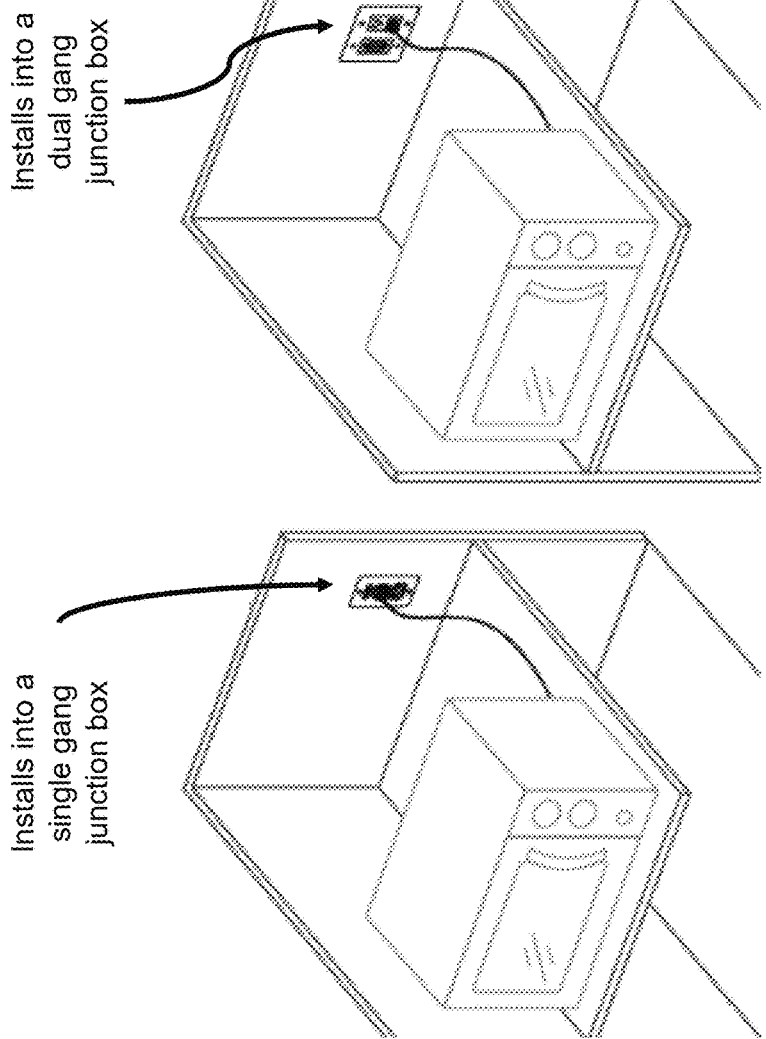

Regardless of the specific configuration of the safety interlock and its disposition with respect to the outlet, the safety interlock is configured such that interlock may be disposed within a standard junction box and provide a de-energizing connection to one or more outlets electrically interconnected therewith. Various configurations of safety interlocks in accordance with embodiments are provides in FIGS. 7a to 7c. Using such a collocated arrangement it will be understood that it is possible to detect hazards in proximity to the outlet rather than at a distance therefrom as currently required by conventional separate systems.

Incorporation of Integrated Safety Interlock Outlet Into Movable Enclosure

Figure 8A:
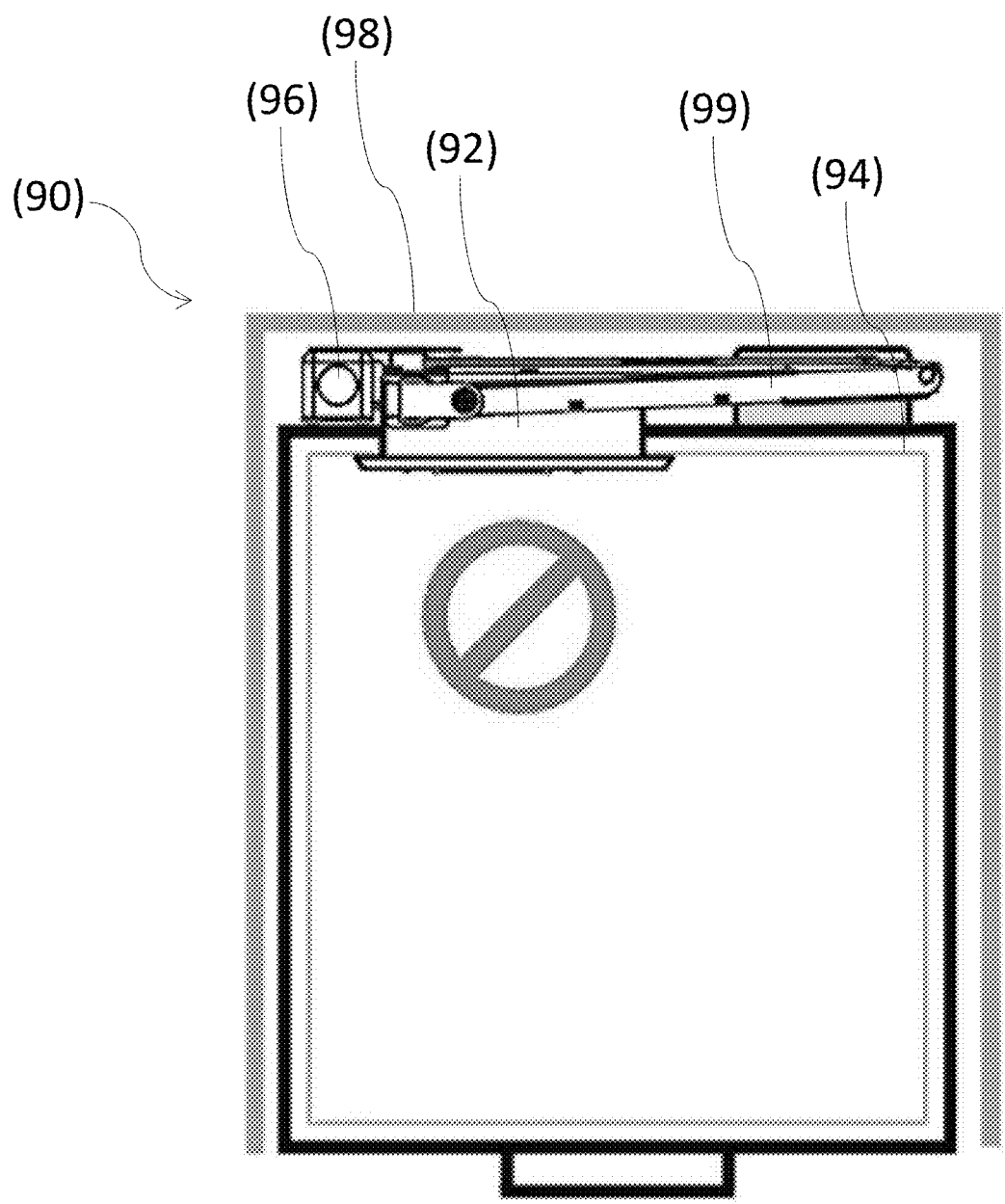
FIGS. 8a and 8b provide schematics of safety interlock outlet installations in movable enclosures in accordance with many embodiments.
Figure 8B:
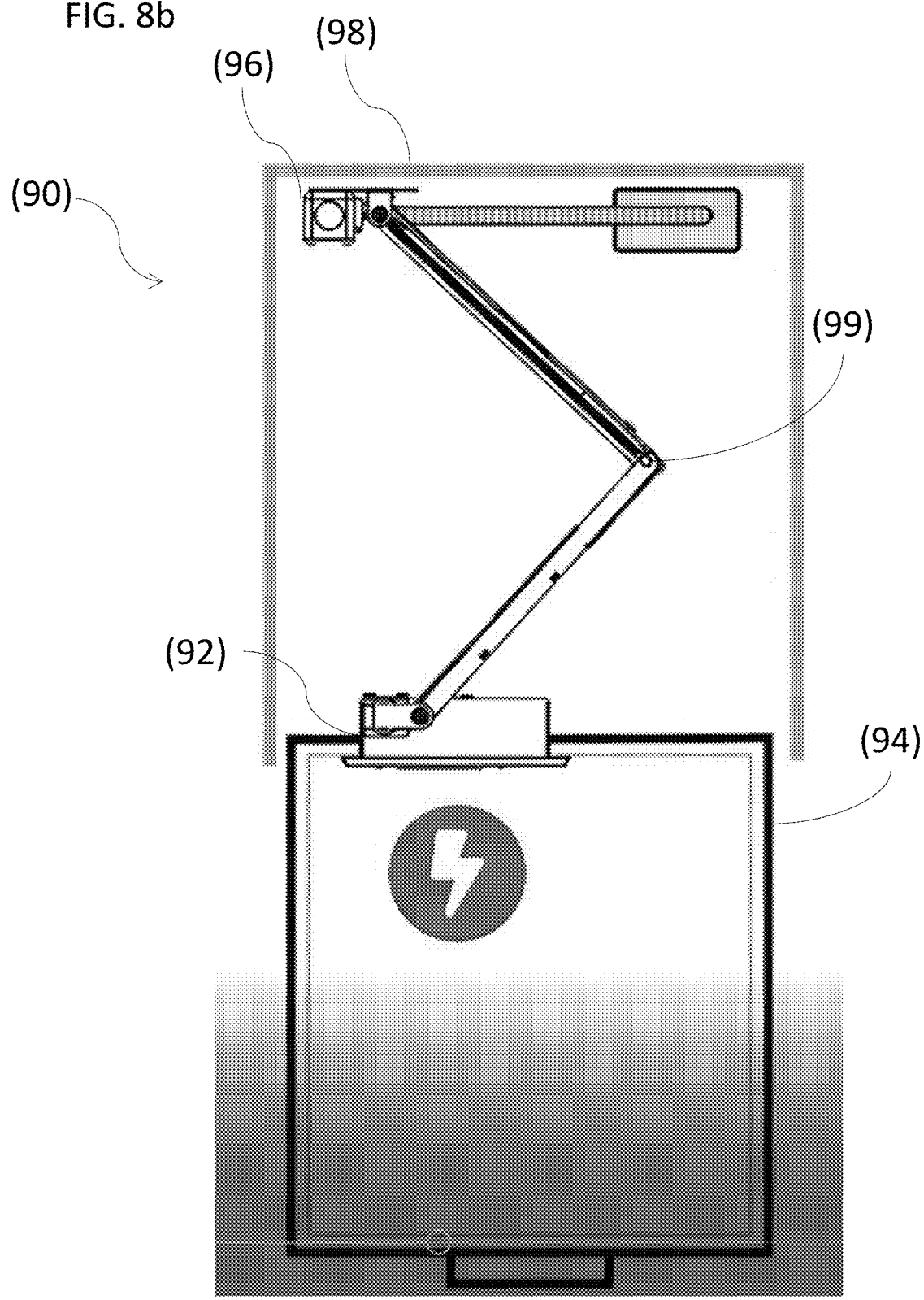

In many embodiments, the integrated safety interlock power outlet assembly is incorporated into a movable portion of an enclosure (90). An exemplary embodiment of a movable outlet (92) integrated into an enclosed drawer (94) is shown schematically in FIGS. 8a and 8b. In such an embodiment, the power outlet assembly includes a power source (96) that would be attached to one of the fixed portions (98) of the drawer unit (90). The power outlet (92) would then be incorporated into a portion of the movable portion of the enclosures (in this example a slidable drawer (94) of the enclosure). In many embodiments, the outlet box (92) would be positioned at the rear of the enclosure, such that it would only be accessible when the movable portion of the enclosure is in an extended or open position, although other arrangements can also be contemplated, as will be described in greater detail below. A flexible/extendable electrical interconnection (99) is then interconnected between the fixed power source and the movable power outlet, and provided with sufficient flexibility and travel such that the electrical interconnection is maintained between the source and outlet across the entire length of the movable enclosure's motion. In such embodiments the safety interlock may also incorporate a positional sensor such that the outlet is de-energized when the movable enclosure and outlet are positioned in a closed or inaccessible position as shown in FIG. 8a and re-energized when the movable enclosure and outlet are in an open or accessible position as shown in FIG. 8b.

Figure 9A:
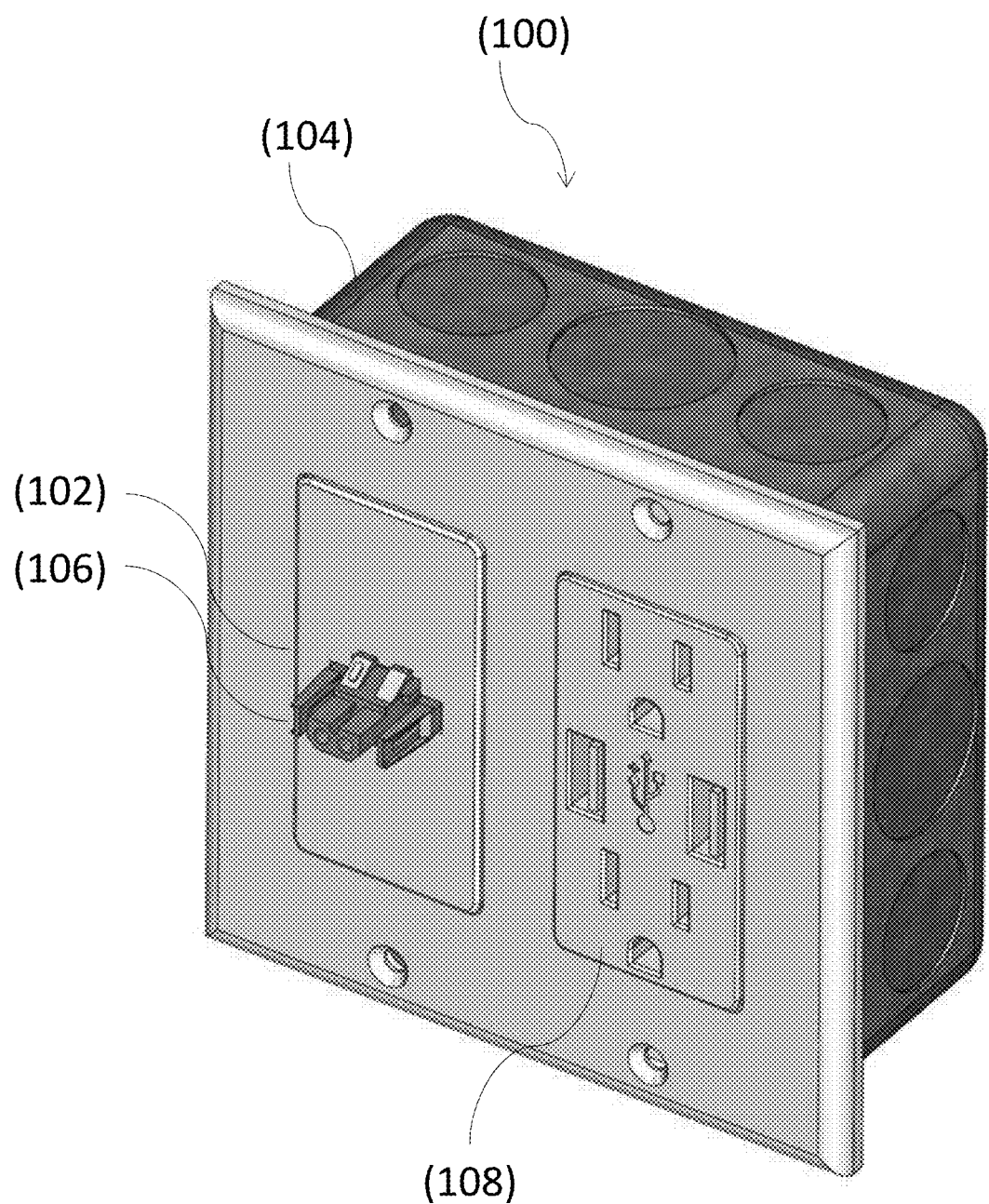
FIGS. 9a to 9c provide schematics of safety interlock outlets incorporating a positional sensor configured for installation in a movable enclosure in accordance with many embodiments.

The embodiments of FIG. 9a provide an example of a safety interlock outlet assembly (100) incorporating a positional sensor (102) in a dual gang outlet box (104) configuration adapted to be installed in a movable enclosure (FIG. 9b), however, it will be understood that other configurations may be formed within the limits of the disclosure. For example, in many embodiments positional sensors may be disposed in a single gang configuration as described above with reference to FIGS. 7a and 7c. Regardless of the specific configuration, in embodiments of safety interlock power outlets incorporating positional sensors, the sensors would be installed in a fixed location such that the external facing connector (106) may engage with the movable enclosure when the movable enclosure is in a closed position such that the outlet (108) is automatically de-energized.

Figure 9B:
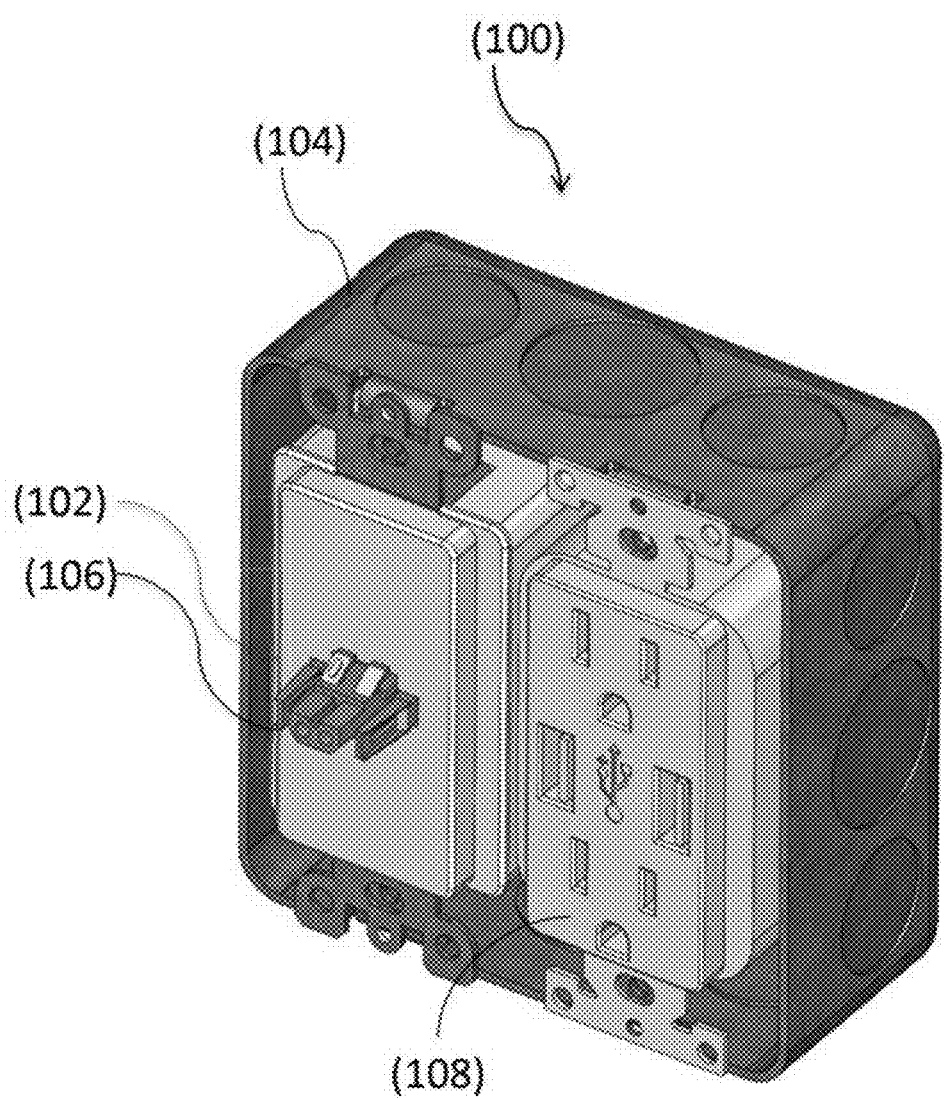

Although the embodiments provided in FIGS. 9a and 9b provide an integrated safety interlock power outlet adapted for installation in an enclosure such that the outlet has position behind the movable enclosure, it should be understood that other adaptations and orientations might be provided. Although not shown, such an embodiment could be installed in the base or bottom of the movable part of an enclosure, such as in the bottom of a drawer, or alternatively at the side of the movable enclosure.

Figure 9C:
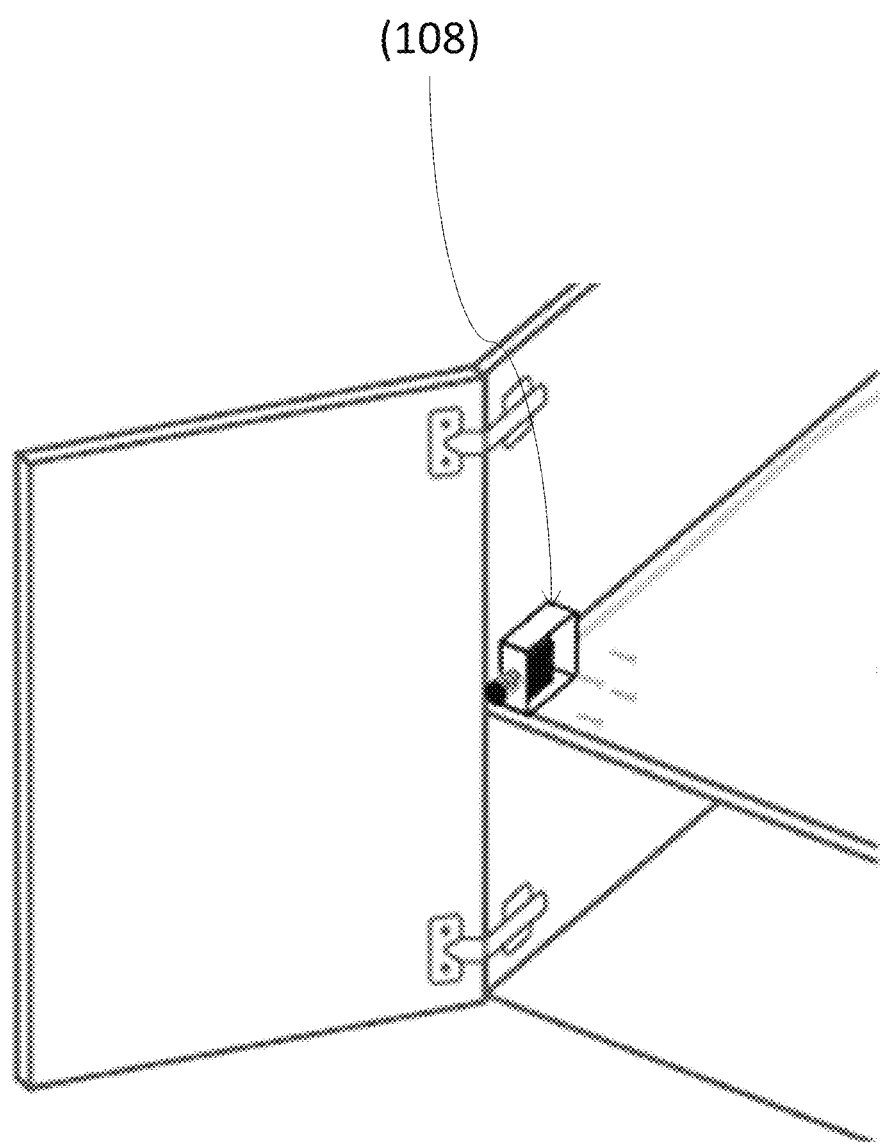

Although a single type of movable enclosure, incorporating a drawer is provided in FIG. 9, it should be understood that this is only provided as an example. Other movable structures may be provided and the power outlet assemblies incorporated therein, including, for example, hinged cabinets and doors (FIG. 9c), furniture, benches and worktops, vanities, etc.

Embodiments of an Integrated Safety Interlock Connector Outlet

Figure 10A:
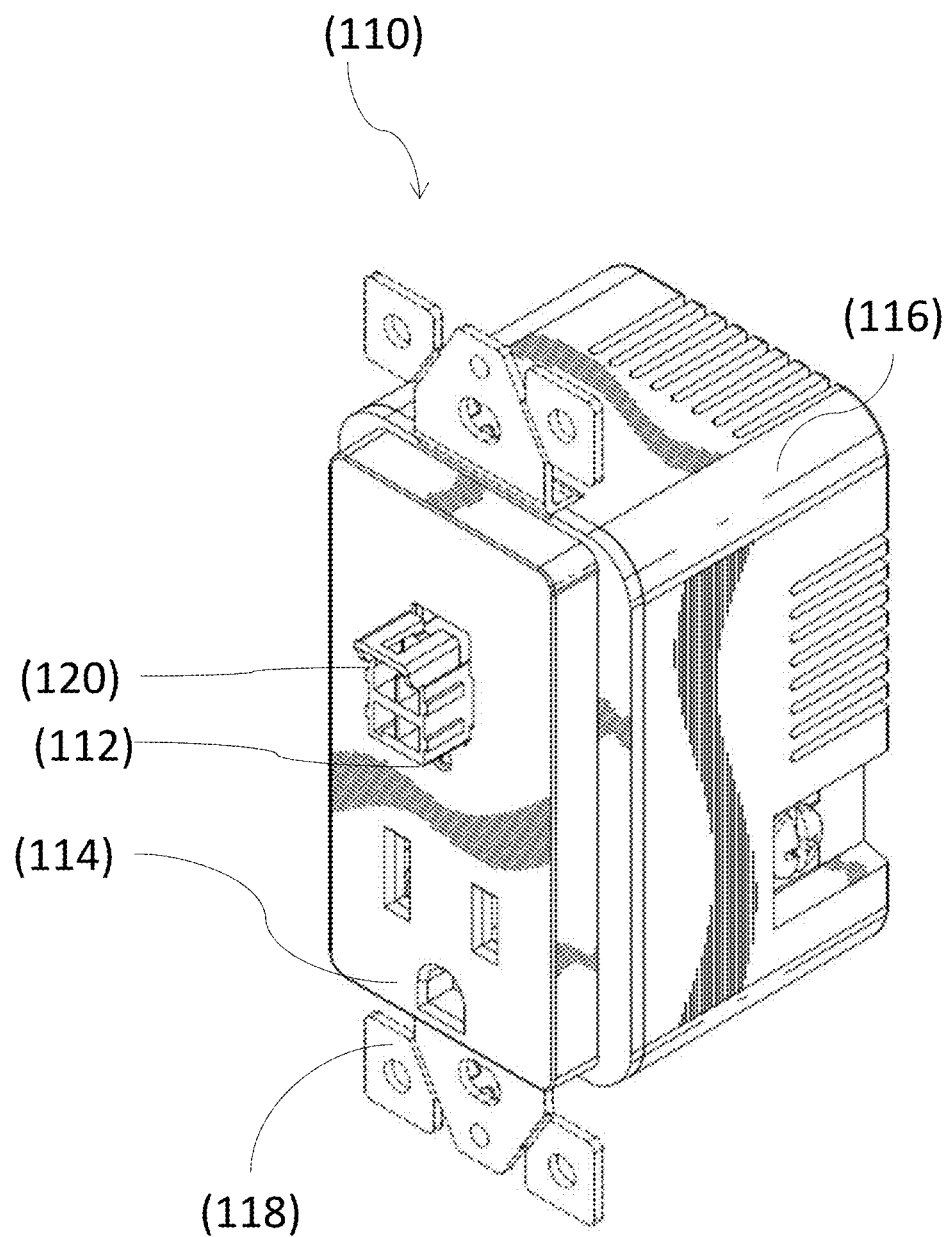
FIGS. 10a and 10b illustrate outlets with integrated safety interlock connections in accordance with many embodiments.

As previously discussed, numerous embodiments of a safety interlock connector may be incorporated into an outlet assembly. For example, FIG. 10a illustrates an embodiment of an outlet (110) with an integrated safety interlock connector (112). The integrated outlet (110) is configured within a single gang configuration such that the interlock connector (112) is connected to the power outlet (114) within the outlet structure. As can be appreciated, the outlet (110) is contained within a single housing (116) that has connection tabs (118) for connecting the outlet (110) to a standard electrical box.

Figure 10B:
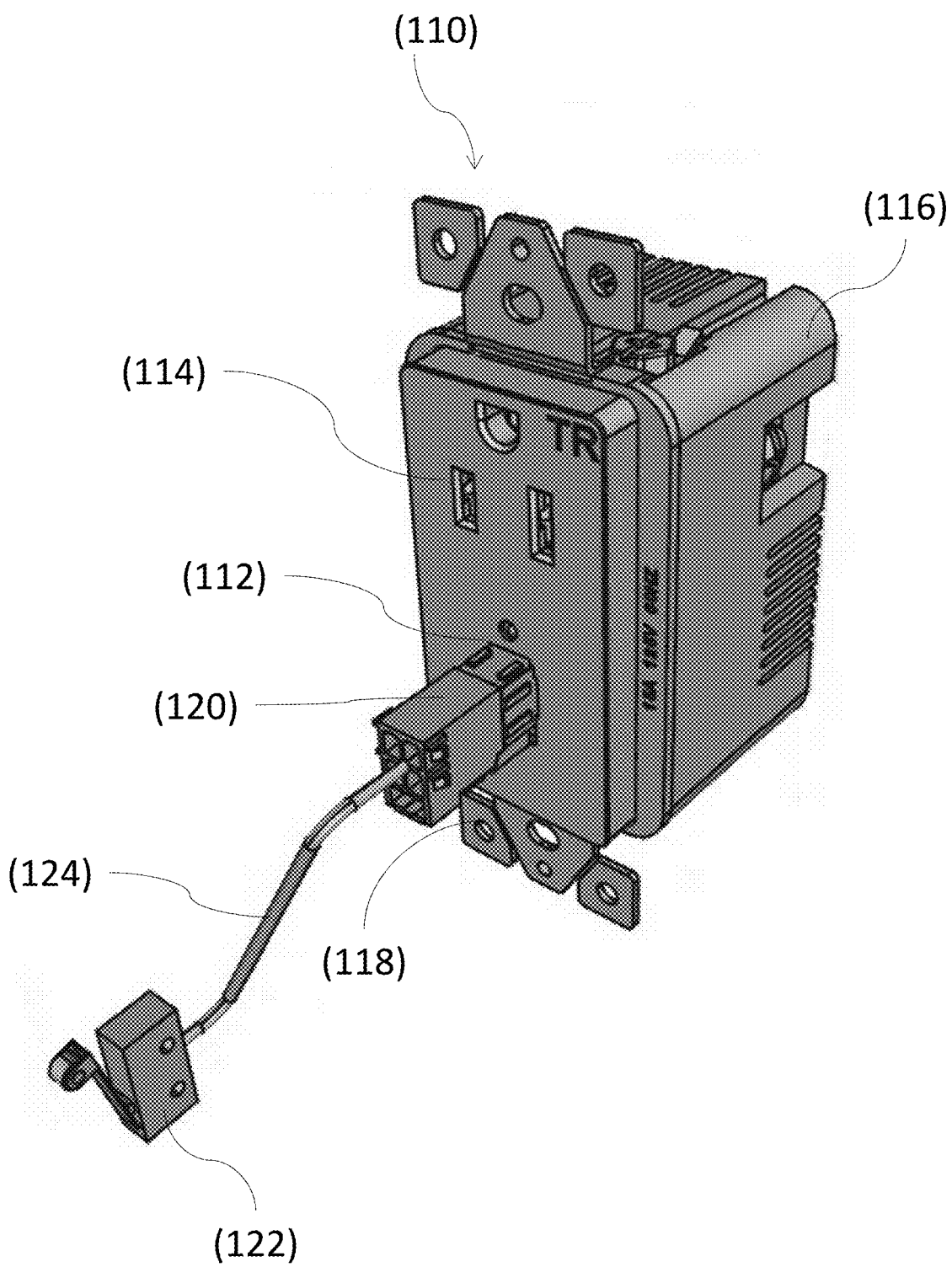

In various embodiments, as shown in FIG. 10b, the integrated outlet (110) has a connection port (112) that is designed to engage via a connector (120) with an external hazard sensor. In many embodiments, as described above with respect to FIGS. 8A and 8B, the connector may connect to a switch (122) that can be configured to engage with a drawer or cabinet door such that the activation of the switch (122) will cause the interlock (112) to cut the power to outlet (114). Likewise, the removal of the drawer or cabinet can deactivate the switch and allow power to resume to the outlet (114). In many embodiments, the switch (122) can be connected to the connection port (120) by a wire (124) of any length such that the switch (122) can be positioned at any reasonable location.

Figure 11A:
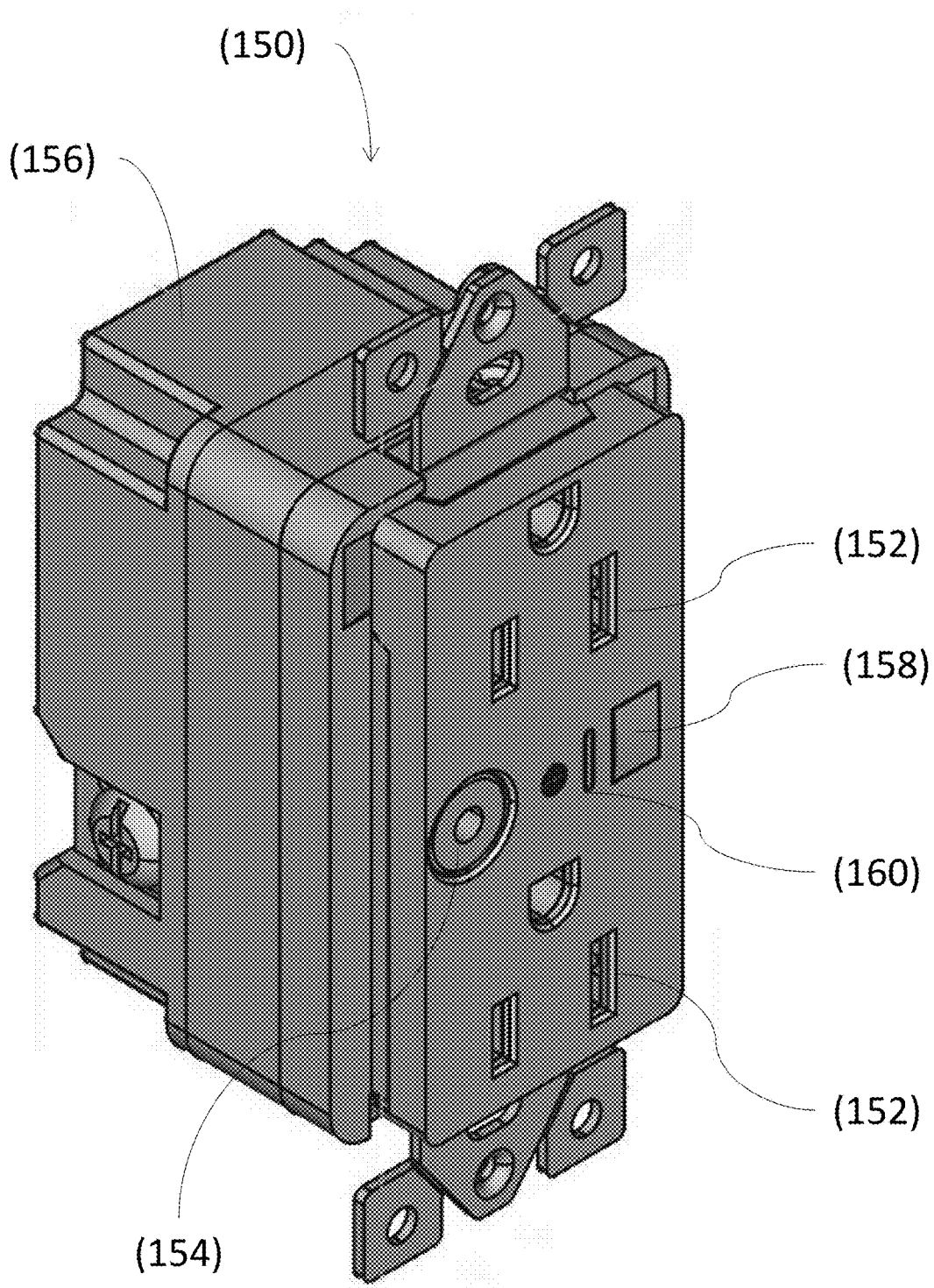
FIG. 11a illustrates a dual power outlet with an integrated interlock and connection port in accordance with many embodiments.

In other embodiments, outlets can be integrated with other types of safety interlocks, such as temperature switches. For example, FIG. 11a illustrates an outlet (150) that is configured to fit within a single gang standard electrical box. The outlet (150) can be configured with two separate electrical connections (152) for a standard electrical plug. Additionally, the outlet (150) can be configured with a safety interlock that is located within the housing (156) of the outlet (150) and is connected to each of the electrical connection ports (152). The safety interlock, in accordance with many embodiments can be configured to de-energize the electrical connection ports (152) when a switch is activated. For example, the safety interlock can be interconnected with internal (158) and external (154) sensors that can detect certain limits such as temperature, electrical fault, water, etc. that will allow the interlock to de-energize the electrical connections (152). In some embodiments, the internal sensor (158) can be connected to an internal display (16) such as an LED or other display element that can indicate when the outlet (150) is energized or de-energized. For example, if the outlet (150) is energized, some embodiments of the display might be a green LED or may be a red LED when it is de-energized.

The outlet (150) can also be configured with a number of other components that can help a user to better control and monitor the outlet. For example, some embodiments may be configured with a Wi-Fi connection to allow the outlet (150) to communicate sensor and/or power data to a database that can be managed by a mobile application. A user can then utilize the mobile application to determine the health and status of the outlet(150) or a number of outlets with sensors. This can even allow users to remotely de-energize the outlet if they determine that need.

Figure 11B:
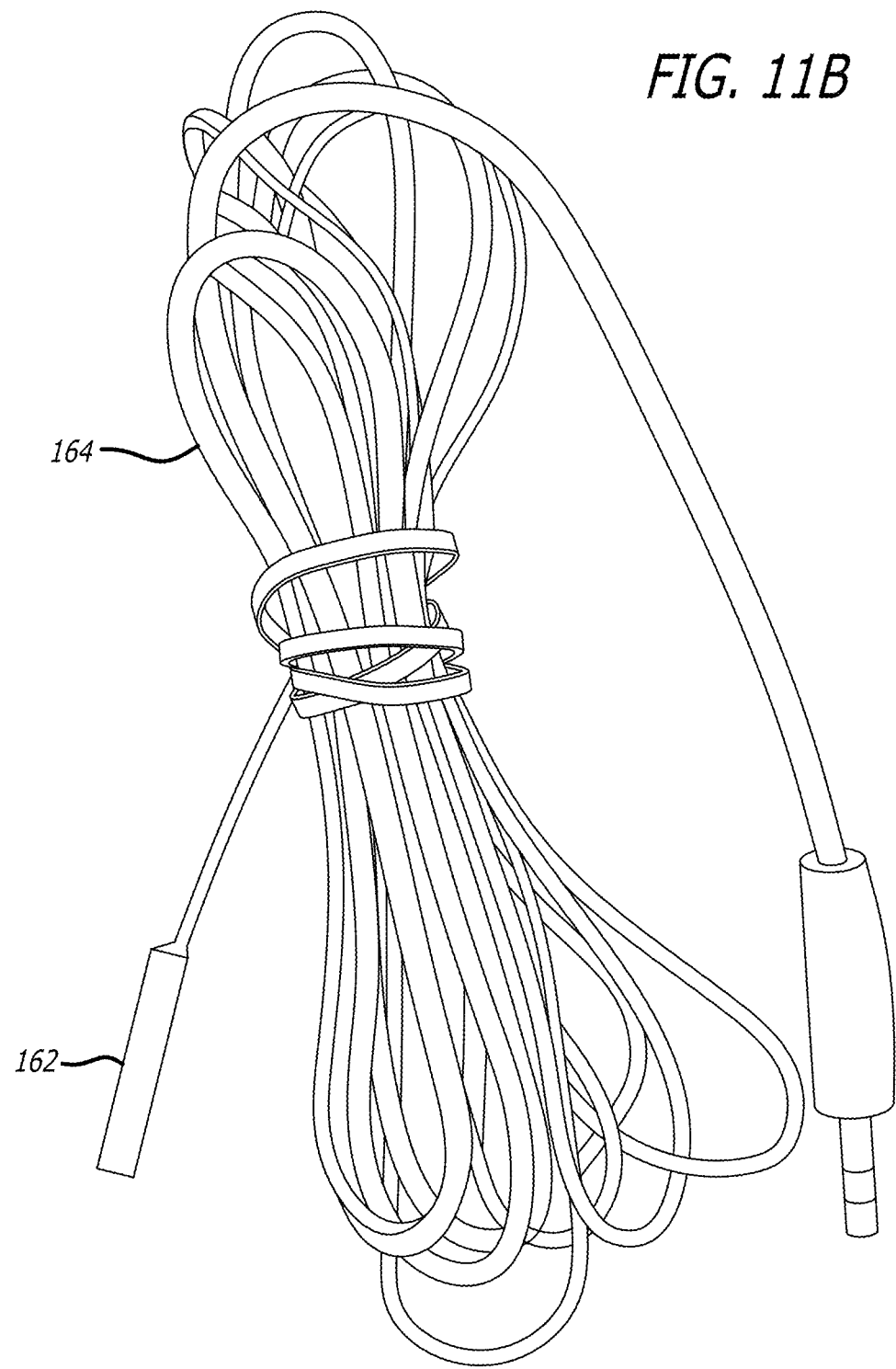
FIG. 11b illustrates a sensor with an attached cable that can be used with various embodiments.

In some embodiments, the outlet (150) and safety interlock can be connected to an external sensor. This can be done through the sensor port (154) that may be connected to a sensor via a cable or other connection system such that the sensor can communication the limits to the safety interlock and de-energize the outlet (150). The external sensor can be located in a number of different locations remote from the outlet (150) to prevent damage to the outlet or other device that is plugged into the outlet before the outlet is exposed to the damage. FIG. 11b illustrates an example of an external sensor (162) that can be used in accordance with various embodiments. The sensor (162) can be any type of sensor that may be suitable for the desired function. For example, the sensor can be a temperature sensor, water, pressure, etc. In many embodiments, the sensor (162) can have a chord (164) of any length that can allow for the placement of the sensor in a suitable location.

Figure 12:
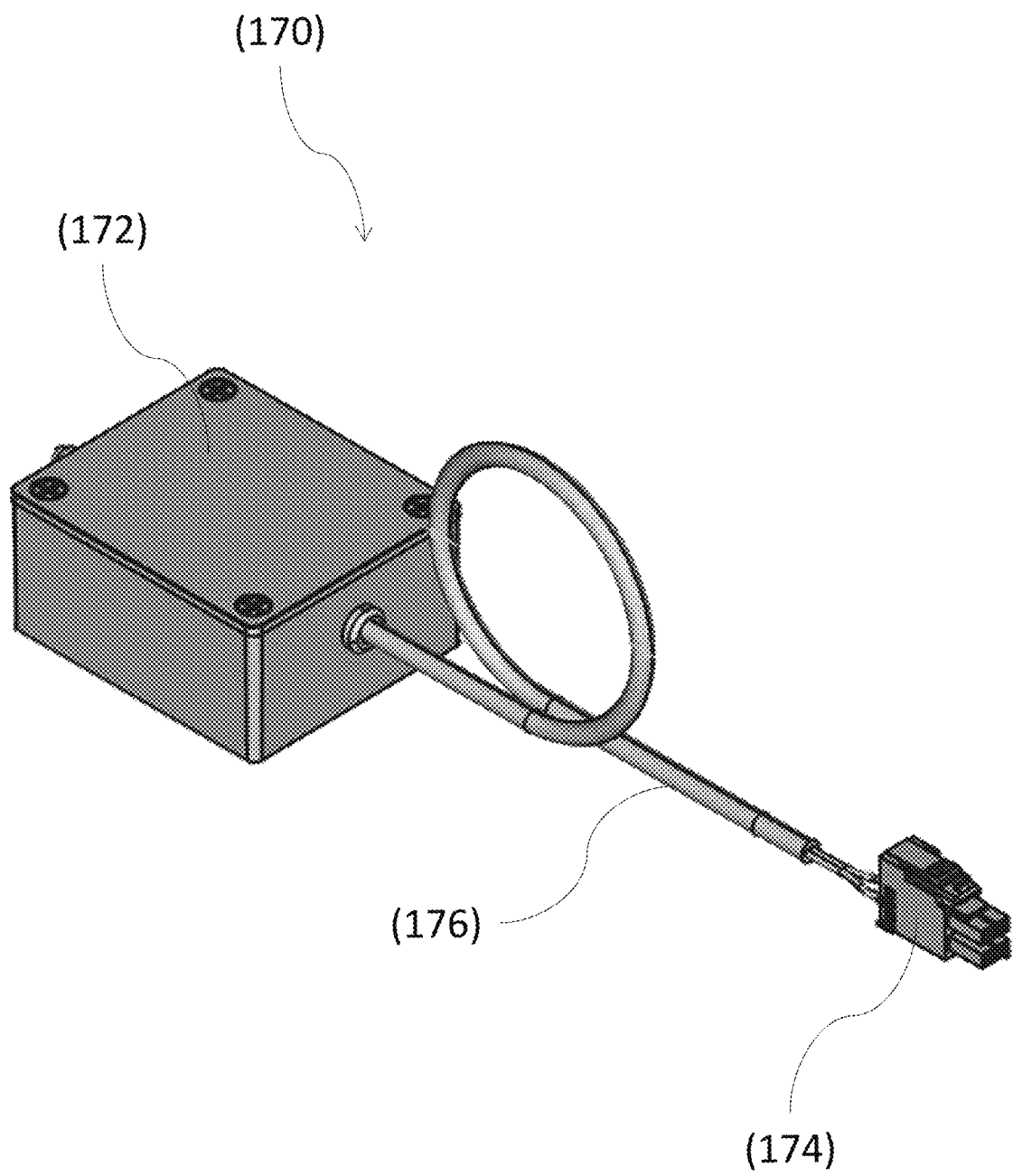
FIG. 12 illustrates a sensor system that can engage with a power outlet in accordance with many embodiments.

While exemplary sensors are described above, it will be understood that any suitable sensor or sensor configuration may be used in association with safety interlock connector outlets according to embodiments. FIG. 12a illustrates an embodiment of a sensor system (170) that can be connected to the outlet illustrated in FIG. 10a or FIG. 11a, for example. In many embodiments, the sensor system (170) can have a housing (172) that houses one or more sensor components. As can be appreciated, the sensor can be any number of sensors such as a temperature, water, pressure sensor etc. The Sensor can be interconnected with a power outlet, such as that illustrated in FIGS. 10 and/or 11, through a connection port (174) and a wire (176). Although a particular connection port (174) is illustrated, it should be understood that various embodiments can use different connection types. The wire (176) can be any length such that the housing (172) and the sensor can be positioned at any reasonable location. It will be understood that the sensor system may be positioned within a cabinet or other enclosure such that the sensor detects hazardous conditions within such enclosures or such that such sensors are may be activated by the opening and/or closing of the door. This can be useful in such instances when a user would like to have an active outlet only when using a particular small appliance stored in the cabinet.

Figure 13A:
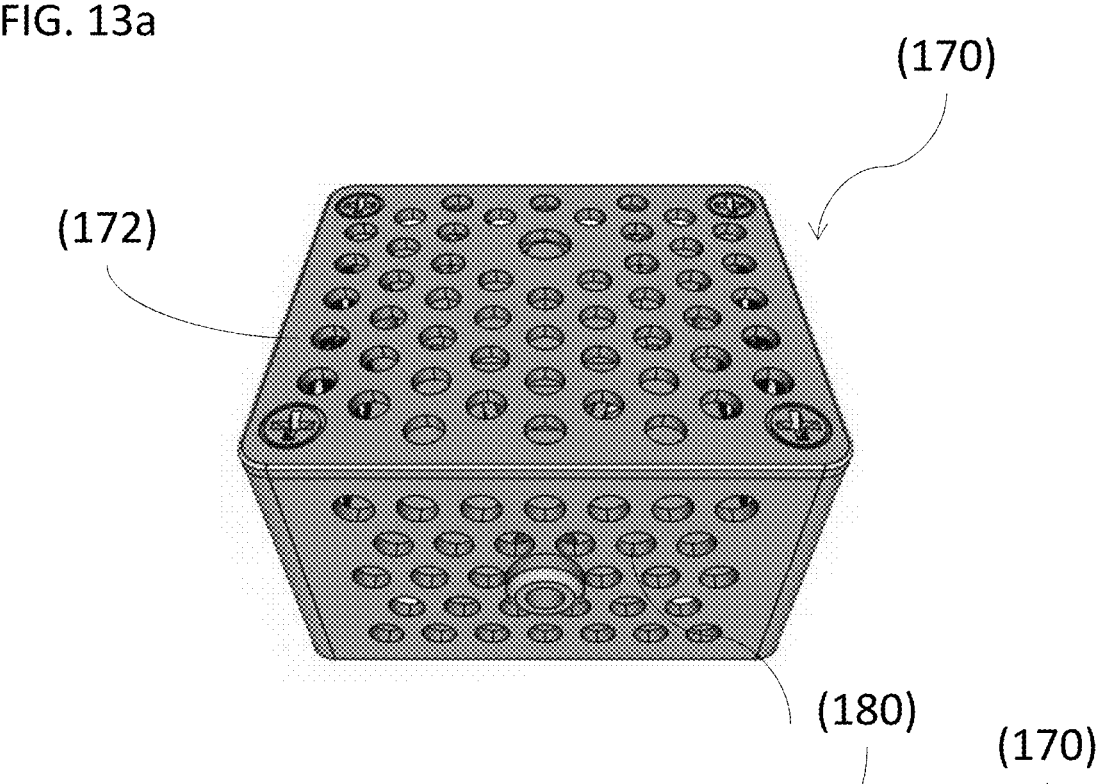
FIGS. 13a to 13d illustrate a housing for a sensor in accordance with many embodiments.
Figure 13B:
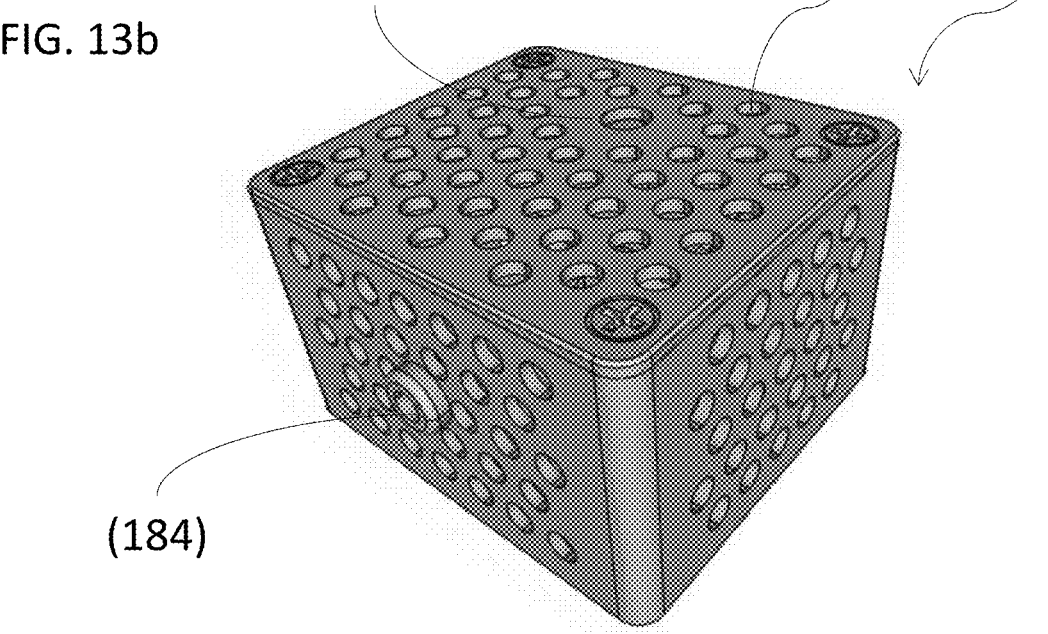
Figure 13C:
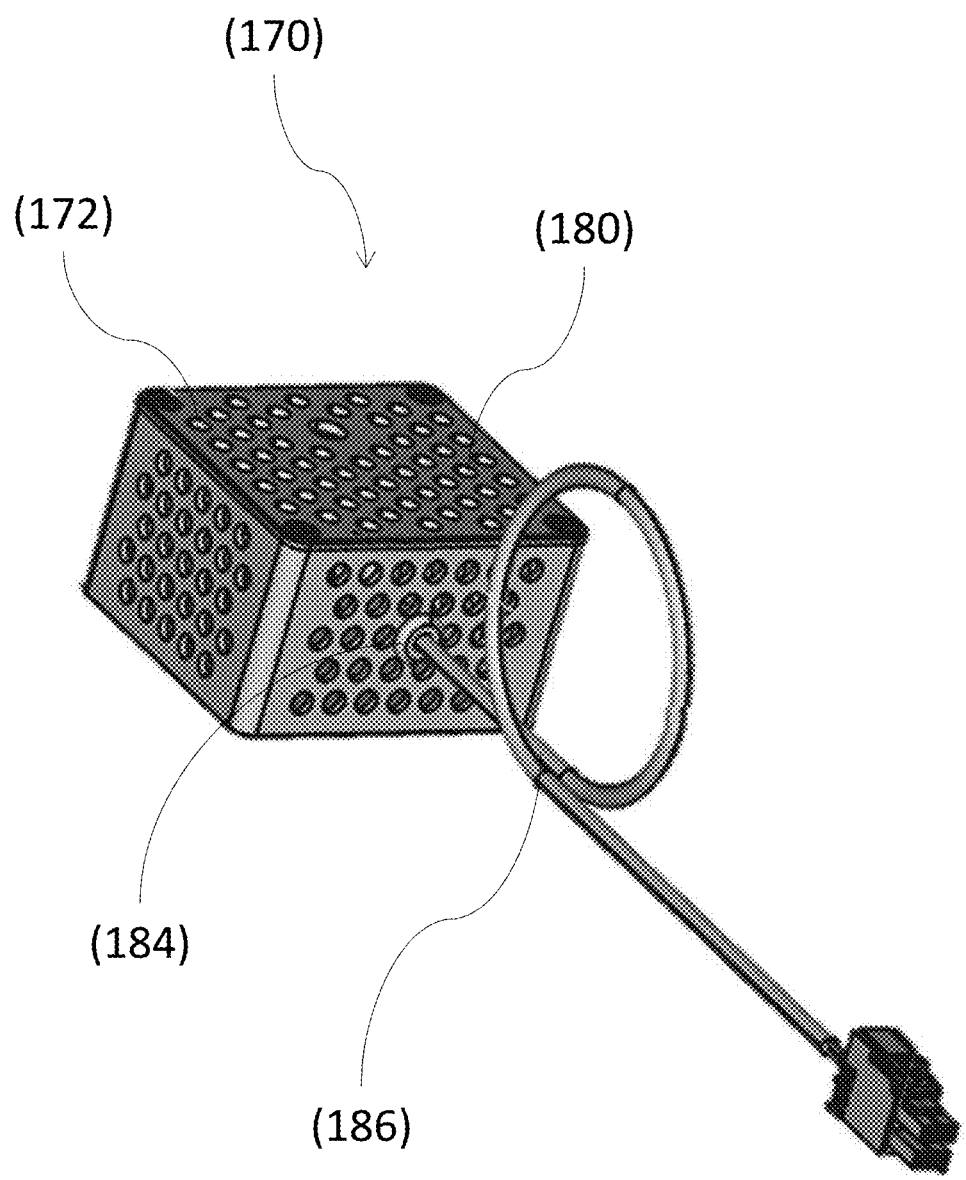
Figure 13D:
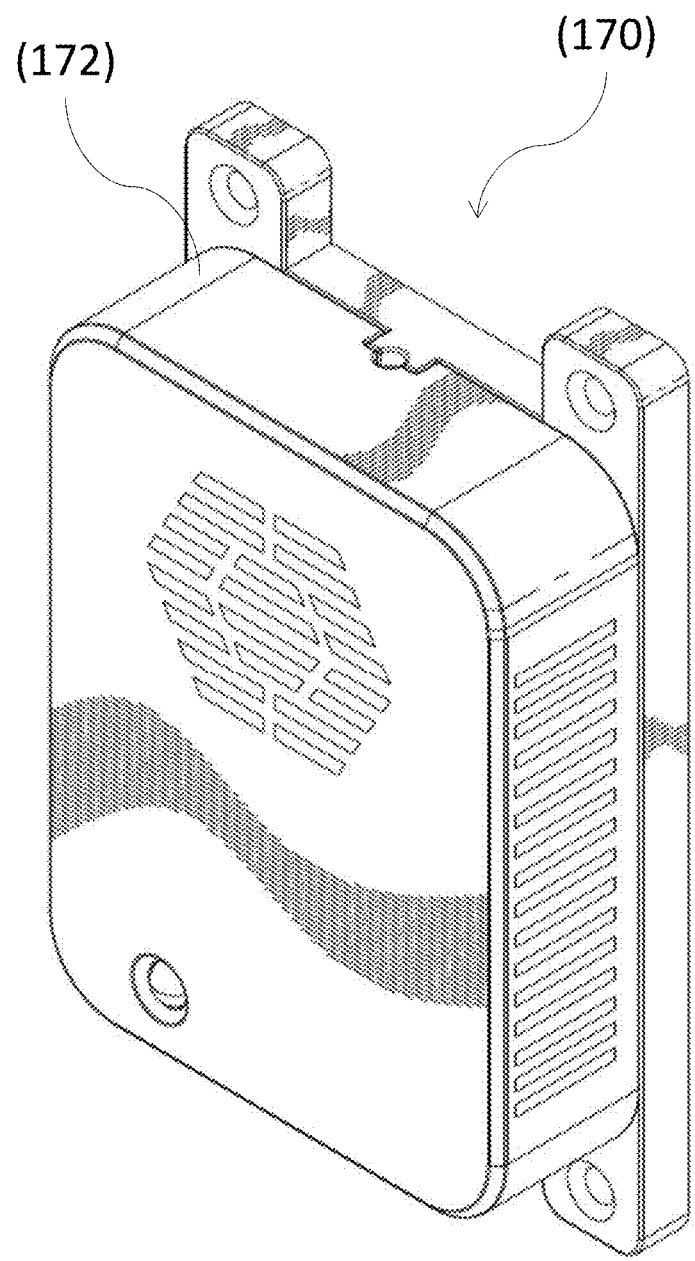

As can be appreciated, sensor housings can take on a number of configurations that may allow the sensor to perform as desired. For example, FIGS. 13a and 13b illustrate different perspective views of sensor housing (172) that can be used in conjunction with any number of sensors illustrated and/or described throughout this description. Additionally, various embodiments of the housing (172) can have an external chord (186), as shown in FIG. 13c, that extends away from the housing to connect the sensor to a safety interlock. The sensor housing (172) can take on any shape or configuration as shown in FIG. 13d, although those presented in the figures are cuboidal. In various embodiments, the housing (172) can have a number of openings (180) that can functionally serve to allow airflow for cooling and/or improve the ability of the sensor to function. For example, some embodiments may be equipped to house a temperature sensor where the temperature sensor requires the need to be in contact with the surrounding environmental conditions. Accordingly, the apertures (180) can serve to allow the temperature within the housing (172) to be the same as the surrounding air. Additionally, some embodiments may have an individual aperture (182) specifically for the sensor to be exposed to the surrounding environment. In accordance with many embodiments, the housing (172) can have a connection port (184) that allows for the sensor to be connected to the outlet(s) described herein. It can be appreciated that the connection can be in a number of different suitable configurations. Some embodiments may have a power assembly, not shown, that extends between the sensor and the outlet.

Finally, it can be appreciated that the various embodiments of sensors and outlets with associated safety interconnects can be used separately or in combination with any embodiment such that any suitable configuration of outlets with safety interlocks and/or sensors can be used.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:
1. A safety interlock power outlet assembly comprising:
   at least one power outlet;
   a positional interlock;
   at least one safety interlock; and
   at least one sensor capable of detecting at least one hazardous condition within an environment;
   wherein the at least one safety interlock is configured to prevent a flow of electrical current between an at least one power source and the at least one power outlet upon detection of the at least one hazardous conditions;
   wherein the positional interlock is configured to detect the position of the power outlet assembly relative to a specified point external to the power outlet assembly; and
   wherein the safety interlock and outlet are collocated within a single standard junction box.

2. The power outlet assembly of claim 1 wherein the at least one sensor is selected from the group consisting of a smoke detector, heat detector, and toxic gas monitor.

3. The power outlet assembly of claim 2, wherein the heat detector comprises a thermostat.

4. The power outlet assembly of claim 1, wherein the power outlet assembly comprises at least two safety interlocks.

5. The power outlet assembly of claim 1, further comprising a current limiting safety interlock adapted to prevent the flow of current above a specified amperage from the power source to the power outlet.

6. The power outlet assembly of claim 1, further comprising a transformer in electrical connection with the power source and adapted to convert the incoming electrical current from AC to DC.

7. The power outlet assembly of claim 1, further comprising a transmitter in signal communication with the at least one safety interlock for communicating the status of the power outlet assembly to a user.

8. The power outlet assembly of claim 7, wherein the transmitter is configured to automatically transmit upon activation of any one of the at least one safety interlocks.

9. The power outlet assemble of claim 1, wherein the single standard junction box is one of either single gang or dual gang.

10. The power outlet assembly of claim 1, wherein the single standard junction box is one of either single gang or dual gang.

11. The power outlet assembly of claim 1, wherein the outlet assembly further comprises a hazard connector, and wherein the sensor is located external to the junction box and is configured to be interconnected to at least one safety interlock through the hazard connector.

12. A power equipped enclosure comprising:
an enclosure defining an internal volume, said internal volume being accessible;
at least one power outlet disposed within the internal volume of the enclosure;
at least one safety interlock;
a positional interlock; and
at least one sensor capable of detecting at least one hazardous condition within an environment of the enclosure;
wherein the at least one safety interlock is configured to prevent a flow of electrical current between an at least one power source and the at least one power outlet upon detection of one or more of the at least one hazardous condition;
wherein the positional interlock is configured to detect the position of the power outlet assembly relative to a specified point external to the power outlet assembly; and
wherein the safety interlock and outlet are disposed within a single standard junction box.

13. The power equipped enclosure of claim 12, wherein the at least one sensor is selected from the group consisting of a smoke detector, heat detector, and toxic gas monitor.

14. The power equipped enclosure of claim 13, wherein the heat detector comprises a thermostat.

15. The power equipped enclosure of claim 12, wherein the power outlet assembly comprises at least two safety interlocks.

16. The power equipped enclosure of claim 12, further comprising a current limiting safety interlock adapted to prevent the flow of current above a specified amperage from the power source to the power outlet.

17. The power equipped enclosure of claim 12, further comprising a transformer in electrical connection with the power source and adapted to convert the incoming electrical current from AC to DC.

18. The power equipped enclosure of claim 12, further comprising a transmitter in signal communication with the at least one safety interlock for communicating the status of the power outlet assembly to a user.

19. The power equipped enclosure of claim 18, wherein the transmitter is configured to automatically transmit upon activation of any one of the at least one safety interlocks.

20. The power equipped enclosure of claim 12, wherein the single standard junction box is one of either single gang or dual gang.

21. The power equipped enclosure of claim 12, wherein the specified point is disposed on a movable portion of the enclosure.

22. The power outlet assembly of claim 12, wherein the outlet assembly further comprises a hazard connector, and wherein the sensor is located external to the junction box and is configured to be interconnected to at least one safety interlock through the hazard connector.

23. A safety interlock power outlet assembly comprising:
at least one power outlet;
at least one hazard sensor capable of detecting at least one hazardous condition within an environment;
at least one safety interlock configured to prevent the flow of electrical current between an at least one power source and the at least one power outlet upon detection of the at least one hazardous condition; and
at least one hazard connector;
wherein the at least one safety interlock and outlet are collocated within a junction box and the hazard sensor is located external to the junction box and is configured to be interconnected to the at least one safety interlock through the hazard connector.

* * * * *